(12) United States Patent
Gaus et al.

(10) Patent No.: US 11,960,069 B2
(45) Date of Patent: Apr. 16, 2024

(54) CONFOCAL MICROSCOPE

(71) Applicant: NEWSOUTH INNOVATIONS PTY LIMITED, Sydney (AU)

(72) Inventors: Katharina Gaus, Queens Park (AU); Emma S. Sierecki, Bronte (AU); Yann Gambin, Bronte (AU); Arnaud Luc Bauer, Montreuil sur Barse (FR)

(73) Assignee: NEWSOUTH INNOVATIONS PTY LIMITED, Sydney (AU)

( * ) Notice: Subject to any disclaimer, the term of this patent is extended or adjusted under 35 U.S.C. 154(b) by 896 days.

(21) Appl. No.: 16/978,033

(22) PCT Filed: Mar. 5, 2019

(86) PCT No.: PCT/AU2019/050188
§ 371 (c)(1),
(2) Date: Sep. 3, 2020

(87) PCT Pub. No.: WO2019/169436
PCT Pub. Date: Sep. 12, 2019

(65) Prior Publication Data
US 2020/0409130 A1    Dec. 31, 2020

(30) Foreign Application Priority Data
Mar. 5, 2018    (AU) ................. 2018900707

(51) Int. Cl.
*G02B 21/00* (2006.01)
*B33Y 10/00* (2015.01)
(Continued)

(52) U.S. Cl.
CPC .......... *G02B 21/0032* (2013.01); *B33Y 10/00* (2014.12); *B33Y 80/00* (2014.12);
(Continued)

(58) Field of Classification Search
CPC ............ G02B 21/0032; G02B 21/0048; G02B 21/0076; G02B 21/0096; G02B 21/082;
(Continued)

(56) References Cited

U.S. PATENT DOCUMENTS

| 3,013,467 A | 12/1961 | Marvin |
| 5,804,813 A * | 9/1998 | Wang ................... G02B 21/006 250/201.3 |

(Continued)

FOREIGN PATENT DOCUMENTS

| JP | H01315711 A | * 12/1989 | ............. G02B 21/24 |
| WO | 99/40471 A1 | 8/1999 | |
| WO | 2016/061563 A1 | 4/2016 | |

OTHER PUBLICATIONS

International Search Report and Written Opinion of the International Searching Authority, International Application No. PCT/AU2019/050188, dated Jun. 12, 2019, 13 pp.
(Continued)

*Primary Examiner* — Arnel C Lavarias
(74) *Attorney, Agent, or Firm* — Myers Bigel, P.A.

(57) ABSTRACT

A confocal microscope includes a housing, which may be printed, and which includes mounts for receiving optical and other components of the microscope. The positions of the mounts are pre-determined so as to obviate the need for complex calibration of the components. The components and optical path lengths are selected in order to optimise the size of the microscope.

17 Claims, 30 Drawing Sheets

(51) Int. Cl.
*B33Y 80/00* (2015.01)
*G02B 21/08* (2006.01)

(52) U.S. Cl.
CPC ..... *G02B 21/0048* (2013.01); *G02B 21/0076* (2013.01); *G02B 21/0096* (2013.01); *G02B 21/082* (2013.01)

(58) Field of Classification Search
CPC .. G02B 21/00; G02B 21/0004; G02B 21/002; G02B 21/0024; G02B 21/0036; G02B 21/24; G02B 21/36; G02B 21/368
USPC ............... 359/385, 362, 363, 368, 369, 390; 700/117, 118, 119
See application file for complete search history.

(56) References Cited

U.S. PATENT DOCUMENTS

| | | |
|---|---|---|
| 2014/0218783 A1 | 8/2014 | Gugel et al. |
| 2020/0301124 A1* | 9/2020 | Annibale ............. G02B 21/365 |
| 2021/0063964 A1* | 3/2021 | Marshel ............... G03H 1/2294 |

OTHER PUBLICATIONS

Alessandri et al., "All-in-one 3D printed microscopy chamber for multidimensional imaging, the UniverSlide", Scientific Reports, 7:42378, Feb. 10, 2017, 10 pp.

* cited by examiner

CONFOCAL MICROSCOPE

RELATED APPLICATIONS

This application is a 35 U.S.C. § 371 national stage application of PCT Application No. PCT/AU2019/050188, filed on Mar. 5, 2019, which claims priority from Australian Patent Application No. 2018900707 filed on Mar. 5, 2018, the contents of which are incorporated herein by reference in their entireties. The above-referenced PCT International Application was published in the English language as International Publication No. WO 2019/169436 A1 on Sep. 12, 2019.

FIELD OF THE INVENTION

The present invention generally relates to microscopy and spectroscopy systems, particularly, but not exclusively to confocal microscopy and spectroscopy apparatus.

BACKGROUND OF THE INVENTION

A confocal microscope is a special type of fluorescence microscope that facilitates detection of fluorescent samples. It conventionally uses confocal spatial pinholes to block out-of-focus light in image formation and detection. Confocal microscopes are particularly useful in three-dimensional, high-resolution detection of single molecules in biological samples.

Confocal microscopes are extremely complex and high-end instruments. There are a few confocal microscopes currently available on the market. However, most of them are very complicated to operate and require repetitive calibration before sample detection. Users are required to have a good understanding of the principles of the technique to obtain good detection results.

Commercially available confocal microscopes are very expensive. Furthermore, these instruments are large in size, occupy a lot of space for operation and require to be operated under low light conditions (dark room).

The main reason for the large size of these devices is attributed to the requirement of large optical path length and large number of optical components. In many cases, modules are added to a normal microscope body to perform additional tasks. Here, the focal lengths and position of the focal planes are imposed by the microscope body. To respect these constraints, relay lenses and additional focusing elements must be added in the external detection modules. The large optical path length is a cause of signal loss, as each optical element (e.g. mirror, filter, lens, etc.) on its own contributes to light loss. The presence of dust particles along the long optical path also contributes to the light losses.

Another drawback of currently available confocal microscopes is the presence of a large number of optical elements, causing issues with misalignments and chromatic aberrations. This is the most common source of loss of signal intensity and resolution in confocal setups.

SUMMARY OF THE INVENTION

In accordance with a first aspect, the present invention provides a confocal microscope, comprising a housing for mounting a detector and a plurality of optical components, at least some of the optical components being fixed in position within a body of the housing.

In an embodiment, the housing and the body of the confocal microscope are integrated. In an embodiment, the body forms a number of mounts arranged to receive optical components of the microscope. The mounts are positioned relative to each other to obviate the need for calibration of components. In an embodiment, the housing is manufactured by a process of 3D printing.

In an embodiment, the detector and optical components are selected and positioned in order to optimise the optical path as compared with a standard confocal microscope, whereby to optimise the dimensions of the confocal microscope.

In an embodiment, there is provided a simplified confocal microscope that can be produced and manufactured consistently and inexpensively. In an embodiment, this is assisted by employing a 3D printing technique for manufacturing the housing of the confocal microscope. A number of optical components are fixed in pre-calibrated positions, via mounts provided within the body of the housing. This is advantageous as it reduces calibration requirements and hence complexity of the microscope. In addition, the housing and fixed components improve stability of the microscope and reduce noise/fluctuations in the detection signal.

In an embodiment, the confocal microscope comprises: a light source for illuminating a sample, an objective for receiving radiation from the sample, a detection arrangement for detecting the received radiation, and feedback arrangement; wherein the feedback arrangement is arranged to facilitate calibration of the detection arrangement for an optimised detection of the sample radiation.

In the above embodiment, the feedback arrangement is employed to further obviate calibration issues in the confocal microscope.

In an embodiment, the confocal microscope comprises a diverging lens to diverge a light beam emitted by the light source.

In an embodiment, the diverging lens is placed in an optical beam path between the light source and the sample.

In an embodiment, the diverging lens having a suitable divergence ensures a minimum optical path length between the light source and the sample.

The applicants realise that a diverging lens requires a shorter optical path in comparison to the traditional use of a converging lens coupled to a pinhole in conventional confocal microscope. Therefore, the applicants employed a diverging lens for transferring the light beam emitted by the light source to the sample. This is advantageous as it reduces the optical path length and hence the overall size of the confocal microscope.

In an embodiment, there is a converging lens placed in an optical beam path between the light source and the sample. A converging lens requires a longer optical path length in comparison to a diverging lens. In this embodiment, the advantage of reduced optical path length is sacrificed due to the employment of the converging lens; however, the working and operation of the confocal microscope remain the same.

In another embodiment, there is no lens.

In an embodiment, a single focusing element is used for the excitation and collection pathways. This ensures that the focal spot created by the excitation source is perfectly collected by the detector.

In an embodiment comprising a detection arrangement, the detection arrangement comprises at least a detector and a scanning mirror. The detector may be a photo-detector.

In an embodiment, the scanning mirror is arranged to deliver fluorescence light collected from the sample to the photo-detector.

In an embodiment, during calibration of the detection arrangement, the feedback arrangement selects a spatial orientation of the scanning mirror that corresponds to an optimised photo-detector output.

In an embodiment, a piezoelectric material is used for providing spatial movement of the scanning mirror for facilitating calibration of the detection arrangement by the feedback arrangement.

In an embodiment, the light source is a laser source emitting laser beam of suitable cross-sectional area and suitable wavelength range.

In an embodiment, the housing of the confocal microscope is monolithically manufactured using a 3D printer.

In an embodiment, the monolithic housing may be made of PLA, ABS, PC or HDPE plastic material.

In an embodiment, a cover is provided for covering the top of the housing for restricting any light entering the microscope.

In accordance with a second aspect, the present invention provides a method of manufacturing a confocal microscope by 3D printing, the method comprising the steps of 3D printing a housing comprising a body, mounting a detector and a plurality of optical components within the body of the 3D printed housing.

In an embodiment, a number of mounts are formed within the body, and arranged to receive optical components in predetermined positions.

In accordance with a third aspect, the present invention provides a 3D printed confocal microscope comprising a 3D printed housing for mounting a detector and a plurality of optical components wherein at least some of the optical components being fixed in positions within the body of the housing.

In accordance with a fourth aspect, the present invention provides a microscope comprising: a light source for illuminating a sample, an objective for receiving radiation from the sample, a detection arrangement for detecting the received radiation, and a feedback arrangement; wherein the feedback arrangement is arranged to calibrate the detection arrangement for an optimised detection of the sample radiation.

BRIEF DESCRIPTION OF THE DRAWINGS

Features and advantages of the present invention will become apparent from the following description of embodiments thereof, by way of example only, with reference to the accompanying drawings in which:

FIGS. 16 to 20(f) show different perspective views of one form of a housing for the microscope of an embodiment of the invention.

FIG. 22(a) shows the Photon Counting Histograms obtained for different species and concentrations;

FIG. 22(b) shows the Number and Brightness analysis performed on a GFP monomer and GFP trimer (induced by the trimeric foldon motif);

FIG. 23(a) shows a fluorescent time trace where large fluorescent events correspond to mCherry-expressing bacteria;

FIG. 23(b) shows the linear relationship between the brightness of a 120 second fluorescent time trace as a function of the OD of the bacterial solution;

DETAILED DESCRIPTION OF EMBODIMENTS

Figure 1:
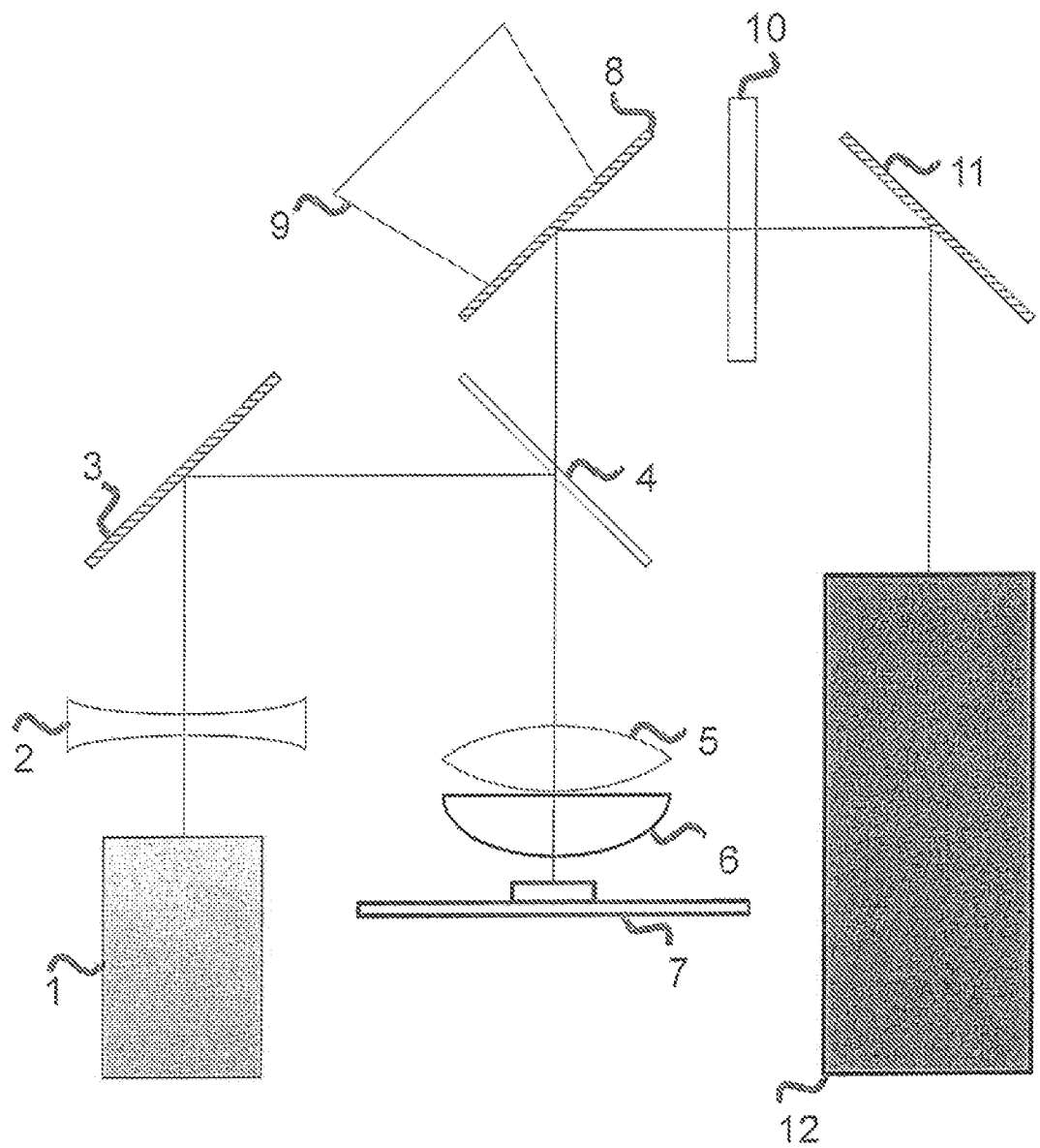
FIGS. 1 to 13 show schematic diagrams of different arrangements of a confocal microscope in accordance with embodiments of the present invention.

Embodiments of the present invention relate to microscopy and spectroscopy systems for fluorescence detection of biological or molecular samples.

Conventional confocal microscopes have many limitations, for example, they are expensive, extremely complex to calibrate, occupy large space, comprise a large number of optical components and complex optical paths, and so on.

The applicants have developed a simplified confocal microscope. To achieve this, in this embodiment, the applicants have employed 3D printing technique for an easy and inexpensive production of confocal microscopes.

The confocal microscope of the present embodiment is compact in size and easy to calibrate. It comprises a housing for mounting a detector and a plurality of optical components, at least some of the optical components being fixed in positions within a body of the housing. The employed 3D printing process provides easy and low-cost production of confocal microscopes. Moreover, since some of the optical components are fixed in their calibrated positions and integrated in the body of the apparatus, the complexity of system calibration is reduced because it eliminates the need for alignment of each and every element of the microscope.

Integration of the optical components into the body of the 3D printed housing also minimizes the influence of the environment, e.g. vibration and stray electromagnetic fields, allowing the microscope of the present embodiment to be a bench-top apparatus, without the need for a suspended air-table.

In addition to the above, in an embodiment, the size of confocal microscope is reduced by (1) limiting the number of optical components and (2) by minimizing the optical path length.

In this embodiment, a shorter optical path provides reduced light losses yielding a better sensitivity for fluorescence detection. The optical path of confocal microscope is reduced by carefully selecting optical components which require a smaller optical path over the others. In order to achieve this, a single divergent lens is employed in place of a combination of converging lens and pinhole of a conventional microscope. The use of a divergent lens saves up to 10 centimetres of optical path length.

The optical path length is also reduced by coupling the objective to a short focal length converging lens which replaces the microscope body and optical elements in a traditional setup. In general, microscope objectives are infinity-corrected, meaning that the light entering the back focal plane of the objective has to be parallel. This is typically, in the prior art, achieved separately in the excitation pathways and in the light collection pathways, by two different lenses. In addition to the added space required to fit more optical elements, this causes issues with misalignments. In some embodiments, pinholes have been omitted compared to traditional confocal setups. The exit/detection pinhole is omitted as the detectors used have very narrow detection area, effectively acting as pinholes. The entry/excitation pinhole can be removed if the light source is well collimated.

In a confocal microscope of an embodiment, radiation emitted by the sample is detected by a detection arrangement. The detection arrangement of the present embodiment comprises a photo-detector and a scanning mirror. The scanning mirror is used to align the emitted radiation into the photo-detector. The alignment of the emitted radiation into the photo-detector is crucial for the quality of sample detection. The present embodiment employs a feedback arrangement that helps in automatically calibrating the detection system without the need for manual adjustments of optical components.

As the confocal microscope of this embodiment is simple, and calibrated through its feedback arrangement, training of users is minimal.

Alignment of the apparatus is controlled by a feedback loop between the detector and the piezo-electric mounted mirror. A reference sample is used and fluorescence intensity is measured continuously. The mirror supported by the piezo mechanical mount is slowly rotated on both axes (either manually or using a computer routine) to detect maximum signal.

Referring now to FIG. 1, there is shown a schematic diagram of an arrangement of a confocal microscope in accordance with an embodiment of the present invention.

In this embodiment, a light beam is emitted by the light source 1 and is expanded by a divergent lens 2. The light source 1 is a laser source. The diverging lens 2 is a bi-concave lens. Light is reflected by a mirror 3. The angle of reflection is 90°. A dichroic mirror 4 is employed to reflect a selected wavelength (excitation wavelength of the sample) in the light beam towards a sample 7. The remaining light is transmitted through the dichroic mirror 4. The excitation light beam is then condensed by a converging lens 5 before irradiating the sample 7 by the objective lens 6. The converging lens 5 is a bi-convex lens. Upon illumination, molecules of fluorescent proteins or dyes in the sample 7 will emit fluorescent light of a longer wavelength than the excitation light. The emitted fluorescence light travels in an opposite direction to the excitation light beam. The emitted fluorescence light is collected by the objective lens 6 and the emission beam is expanded by the converging lens 5. The emission fluorescence is transmitted through the dichroic mirror 4 and reflected by a mirror 8 mounted on a motorized piezo-electric mirror mount 9. Movement of the piezo-electric mirror mount 9 controls the angle of reflection of the emitted fluorescence light beam and allows adjusting the fluorescence light beam into the entrance of a photo-detector 12. The emitted fluorescence beam is then transmitted through an absorption filter 10 that only allows light in a certain wavelength range (band-pass filter) or above a selected wavelength (long-pass region) to be transmitted. The transmitted fluorescence light beam from the absorption filter 10 is reflected by a mirror 11 and guided into the detector 12. In an embodiment, the photo-detector 12 is an avalanche photodiode detector. The photo-detector 12 facilitates detection of fluorescent molecules of the sample 12.

In alternative embodiments, different lenses are used keeping the rest of the set-up similar to as shown in FIG. 1.

In the following FIGS. 2 through 13, different embodiments of the confocal microscope in accordance with the present invention are illustrated. Where components are the same as in FIG. 1, the same reference numerals have been used.

Figure 2:
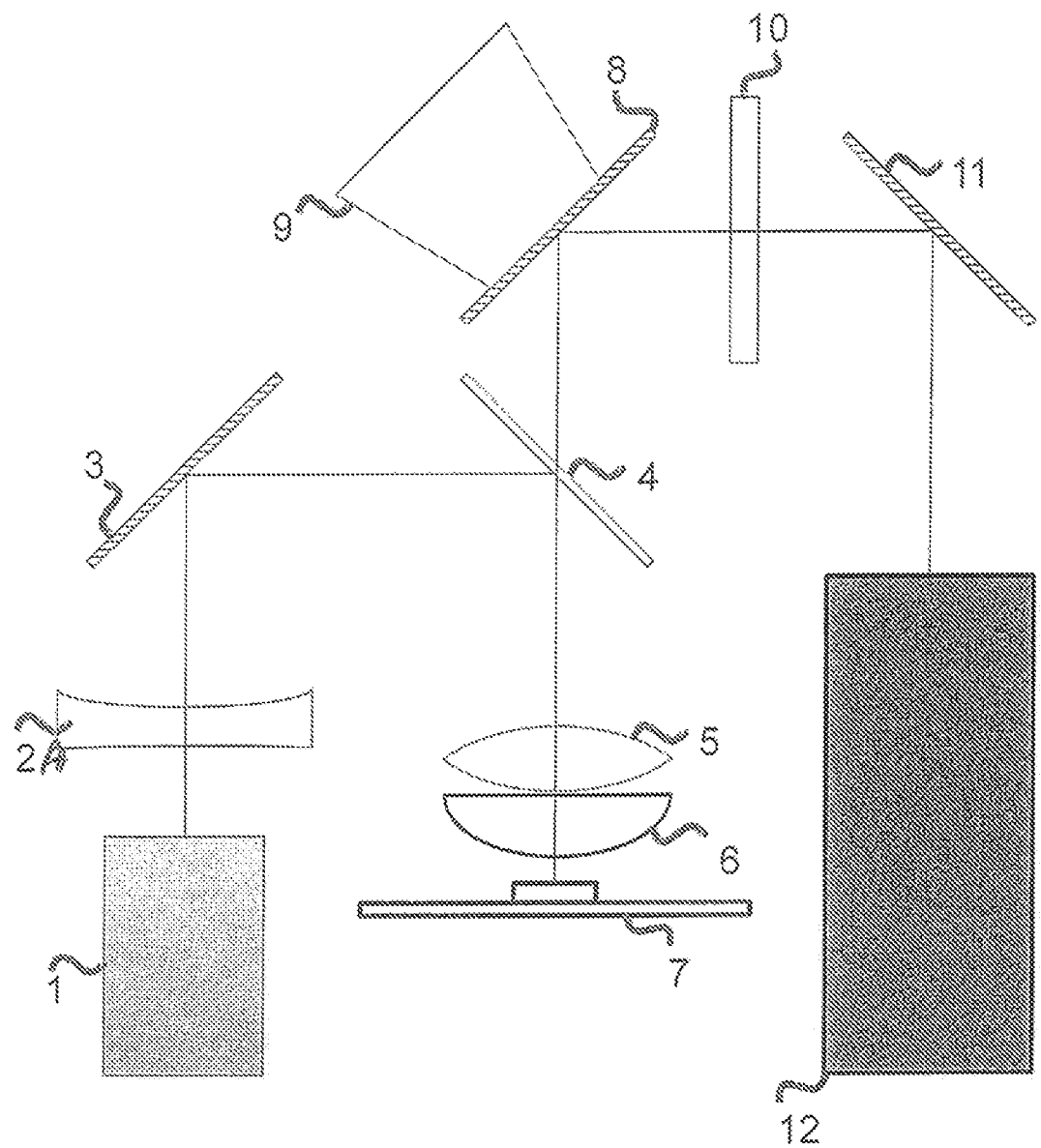

FIG. 2 shows an arrangement of a confocal microscope comprising a different type of divergent lens, in accordance with an embodiment of the invention. In this set-up, a plano-concave lens 2A is used in place of bi-concave lens of FIG. 1.

Figure 3:
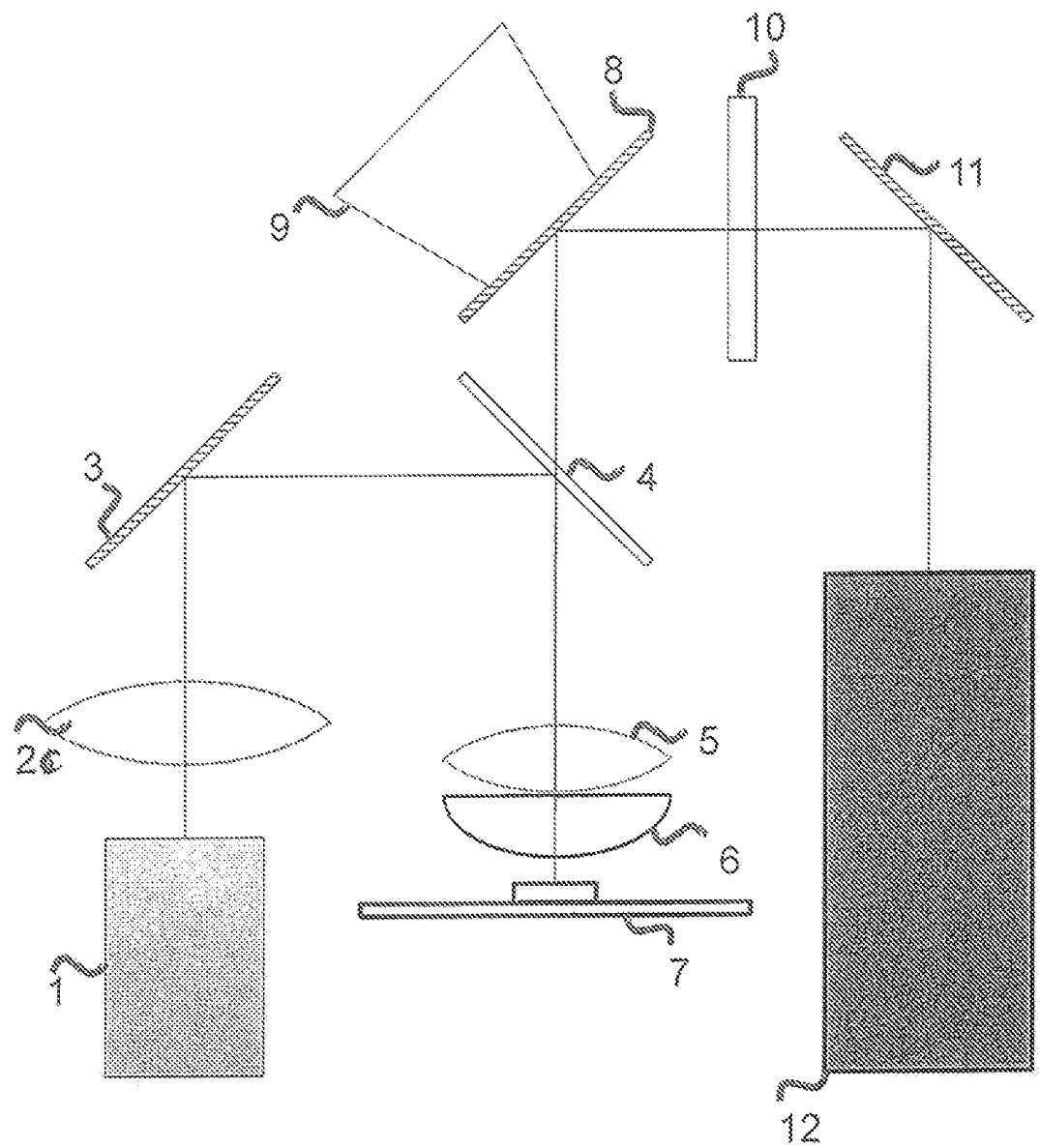
Figure 5:
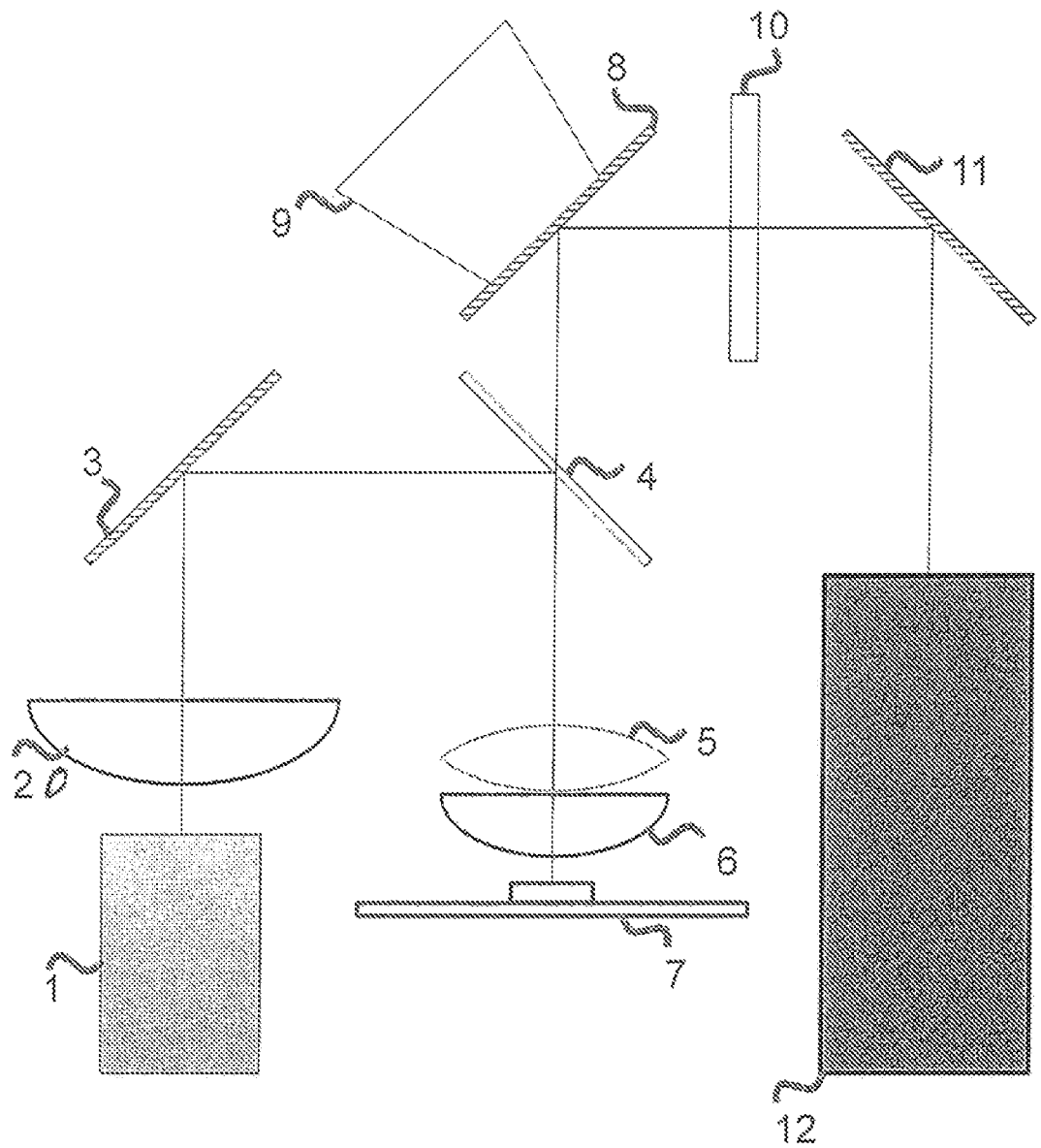
Figure 6:
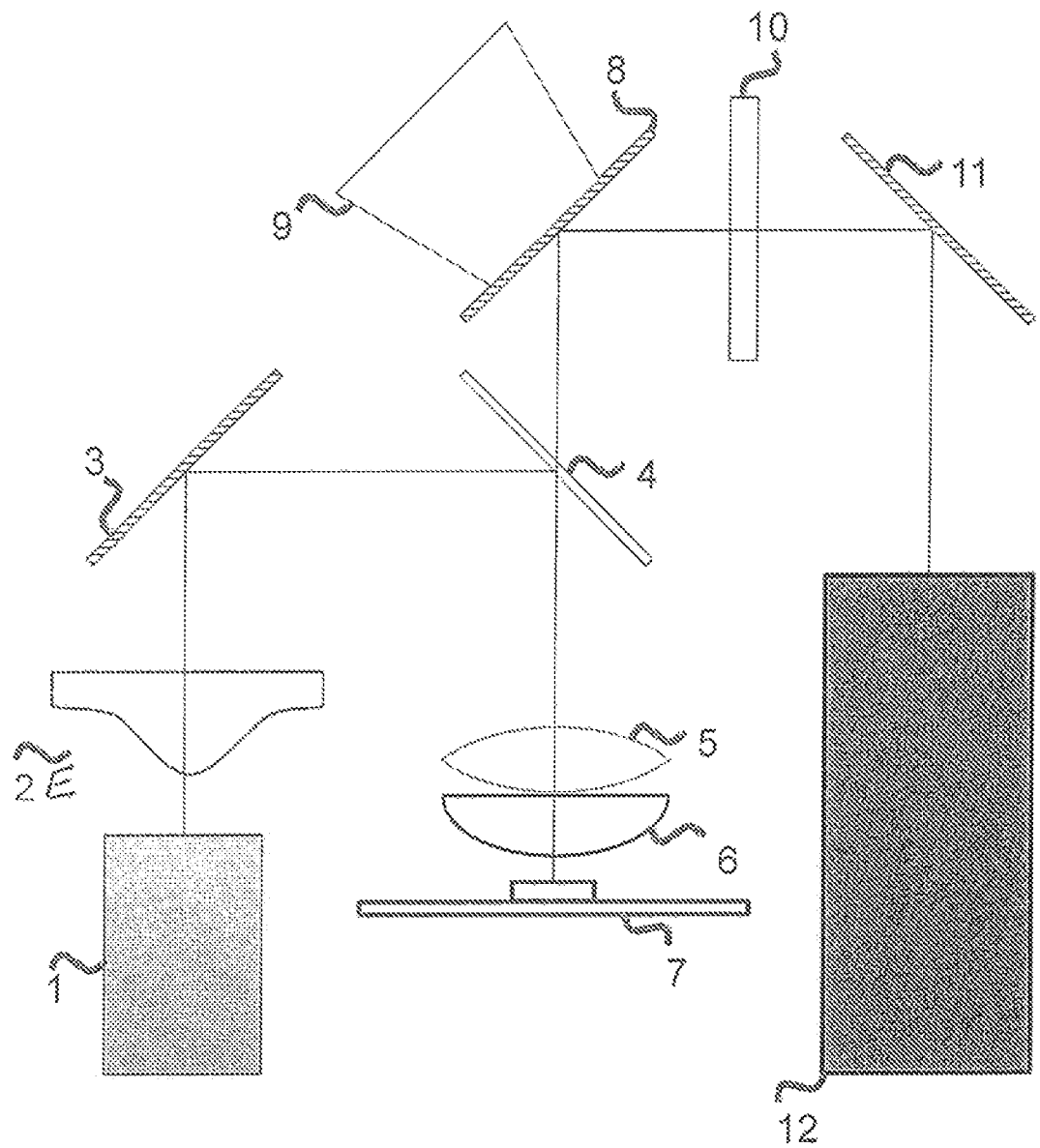

FIGS. 3, 5 and 6 show arrangements of a confocal microscope comprising a converging lens in place of the divergent lens of FIG. 1.

FIG. 3 shows an arrangement of a confocal microscope comprising a bi-convex lens 2C in place of the divergent lens of FIG. 1.

Figure 4:
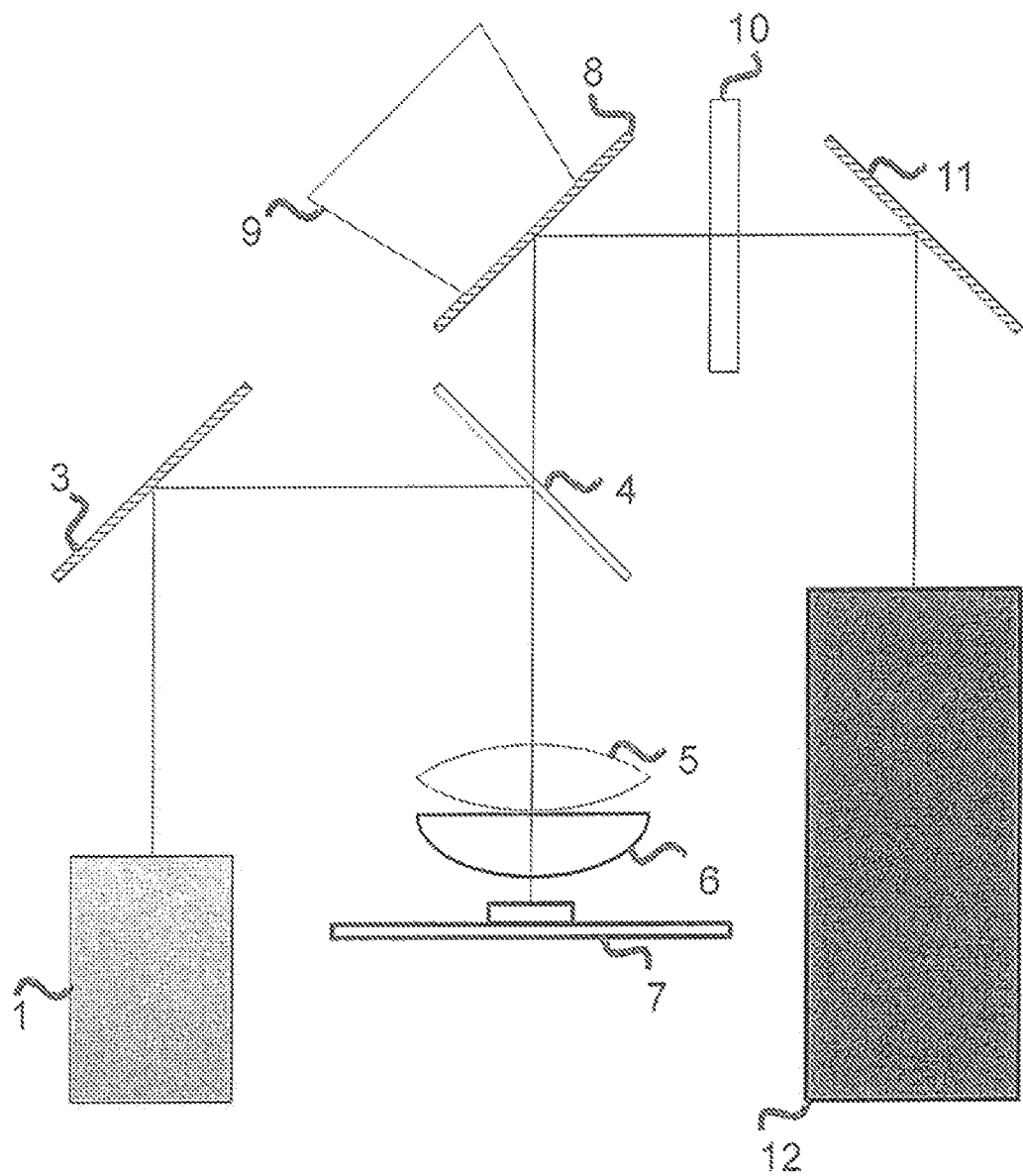

FIG. 4 shows an arrangement of a confocal microscope in which no lens is placed between the light source 1 and mirror 3.

FIG. 5 shows an arrangement of a confocal microscope that comprises a plano-convex lens 2D in place of the divergent lens 2 of FIG. 1.

FIG. 6 shows an arrangement of a confocal microscope that comprises an aspherical lens 2E in place of the divergent lens 2 of FIG. 1.

It is to be noted that the arrangements shown in FIGS. 1 and 2 comprise a diverging lens which provides the advantage of a shorter optical path length for the confocal microscope. This helps in reducing the overall size of the confocal microscope. On the other hand, the arrangements shown in FIGS. 3, 5 and 6 make use a converging lens, therefore, the advantage of a shorter optical path length is not available in these embodiments.

Figure 7:
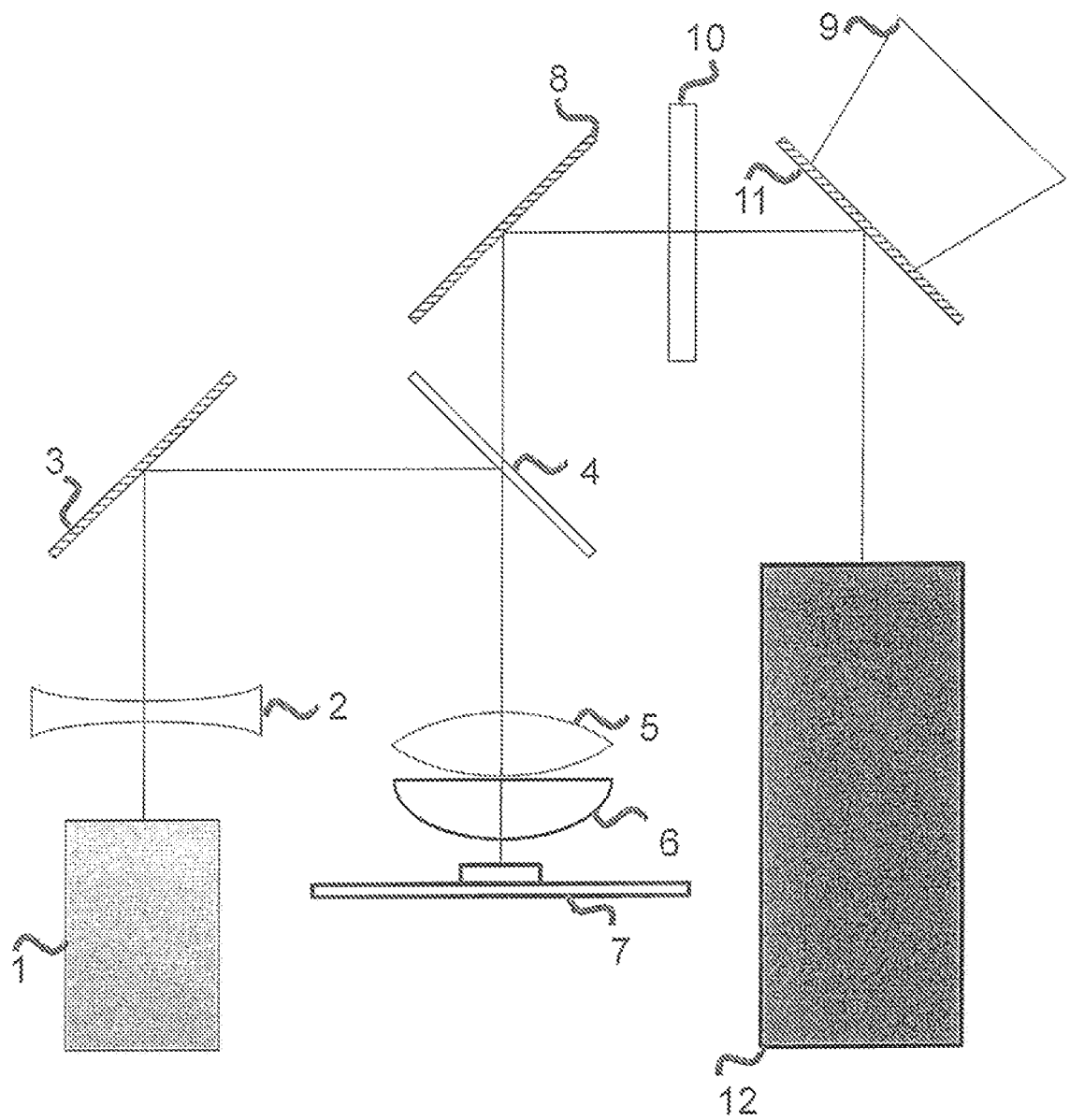

Referring now to FIG. 7, there is a shown an arrangement of a confocal microscope in accordance with an embodiment of the present invention. The optical elements are similar to the ones described in FIG. 1. In this arrangement, mirror 11 is mounted on the piezo-electric mirror mount 9 and mirror 8 is fixed.

Figure 8:
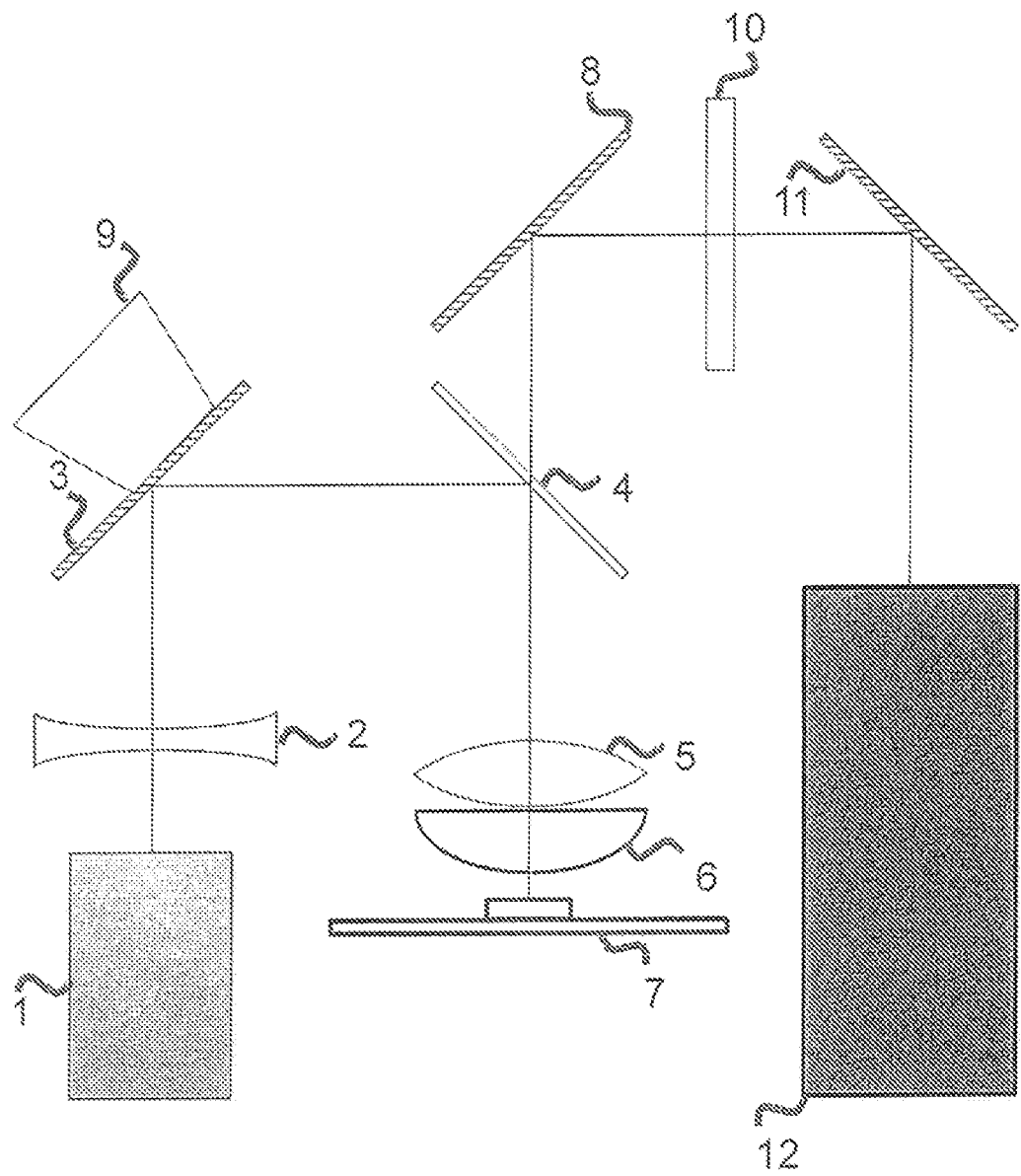

Referring now to FIG. 8, there is shown an arrangement of a confocal microscope according to a further embodiment of the invention. The optical elements are similar to the ones described in FIG. 1. In this arrangement, mirror 3 is mounted on the piezo-electric mirror mount 9 and mirrors 8 and 11 are fixed.

Figure 9:
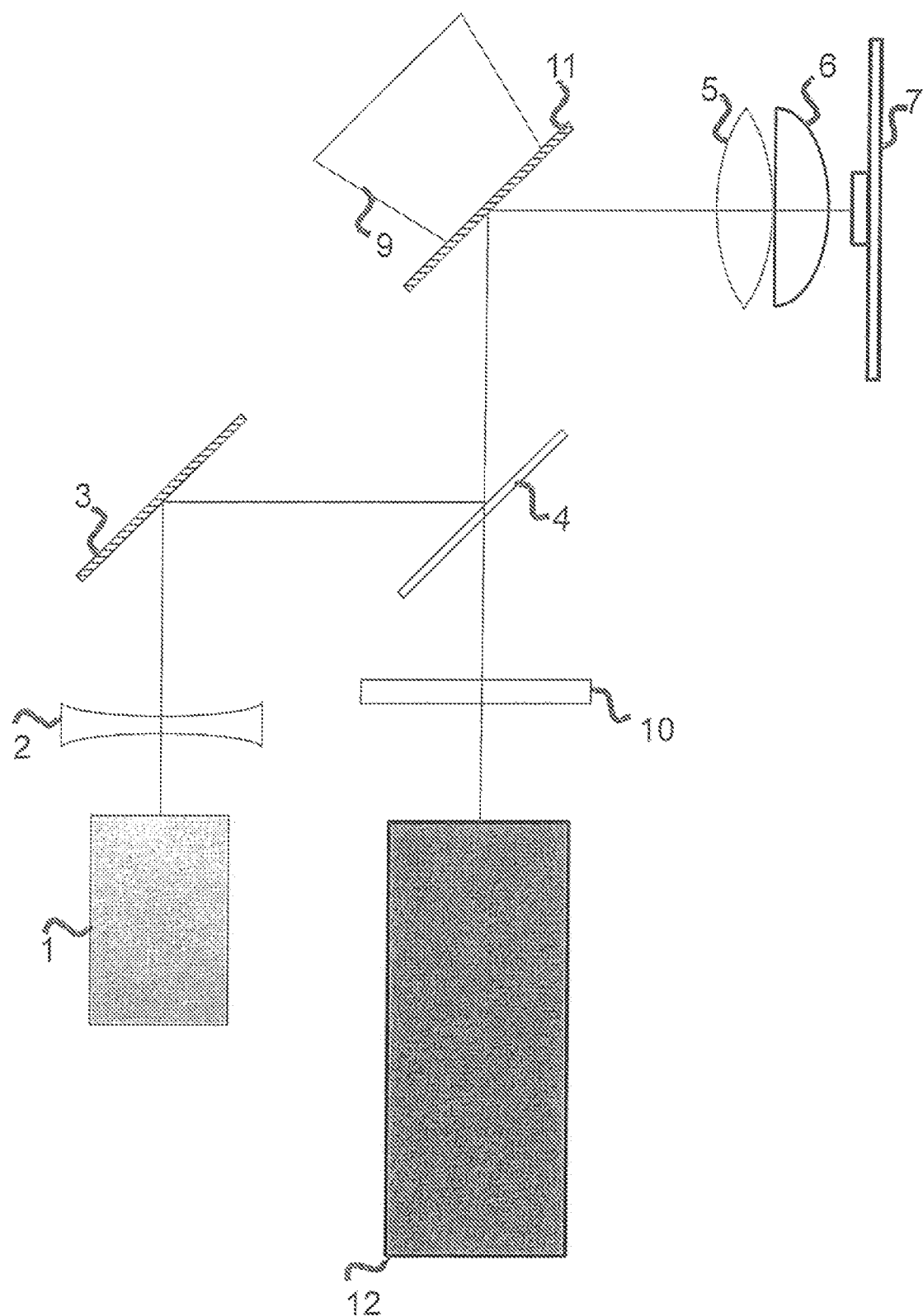

Referring now to FIG. 9, there is shown an arrangement of a confocal microscope according to a further embodiment of the present invention. The optical elements are similar to the ones described in FIG. 1. The excitation light is reflected by the dichroic mirror 4 and guided to illuminate the sample 7 through the converging lens 5 and the objective lens 6 by reflection on the mirror 11 mounted on a piezo-electric mirror mount 9. The fluorescence of the sample 7 is collected by the objective lens 6 and the beam is expanded by the converging lens 5. The emission light is guided by reflection on the mirror 11 mounted on a piezo-electric mirror mount 9, transmitted by the dichroic mirror 4 and the excitation filter 10 to the detector 12.

Figure 10:
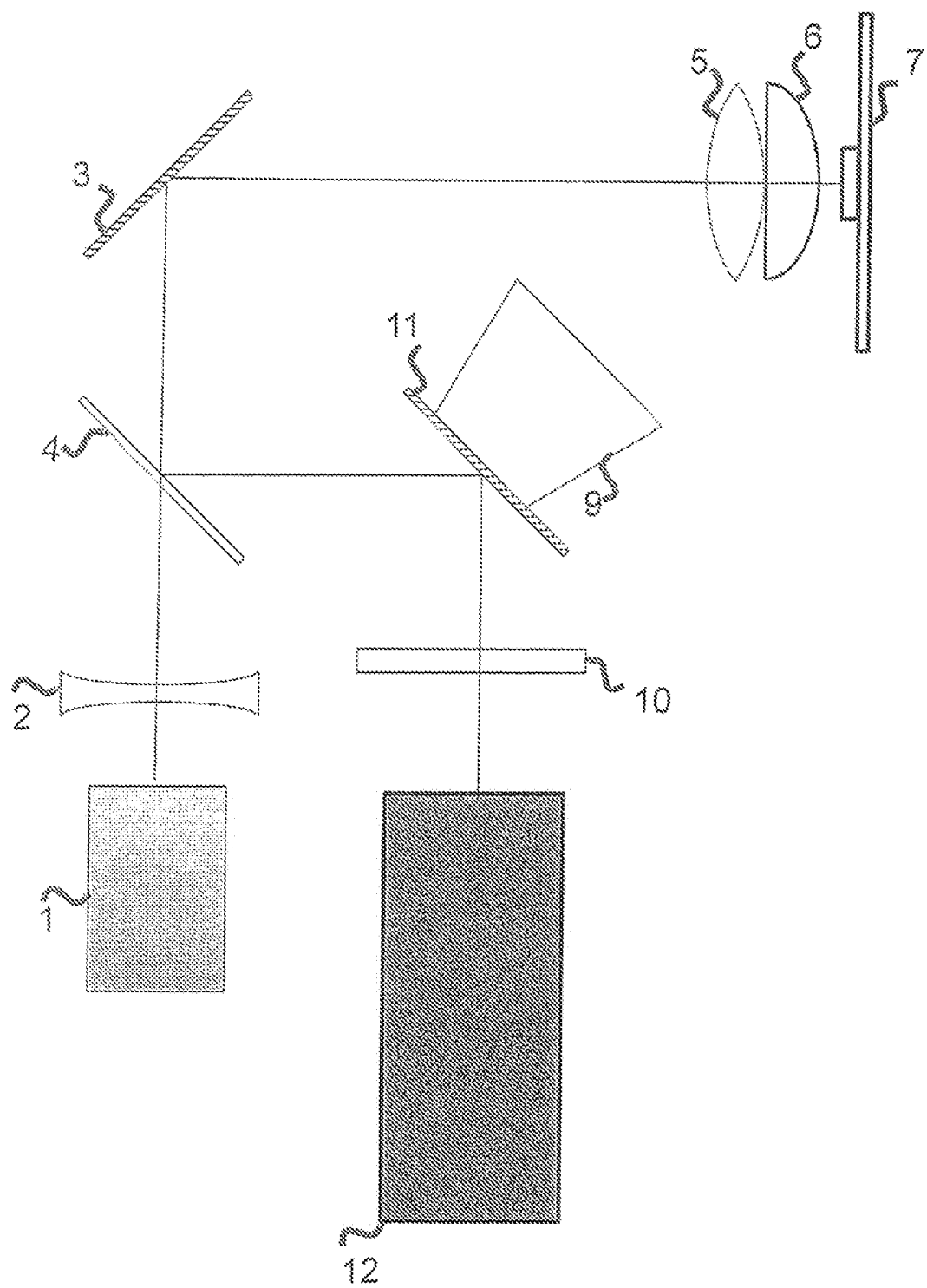

FIG. 10 shows the arrangement of a confocal microscope according to an embodiment of the present invention. The optical elements are similar to the ones described in FIG. 1. The light emitted by the source 1 is transmitted by the diverging lens 2 and the dichroic mirror 4 then guided into the sample 7 by the mirror 3 (through the converging lens 5 and the objective lens 6). The collected fluorescence is reflected by the mirror 3 then by the dichroic mirror 4 and adjusted into the detector by moving the mirror 11 mounted on a piezo-electric mirror mount 9. The spectral profile of the light is adjusted by transmission through the absorption filter 10.

Figure 11:
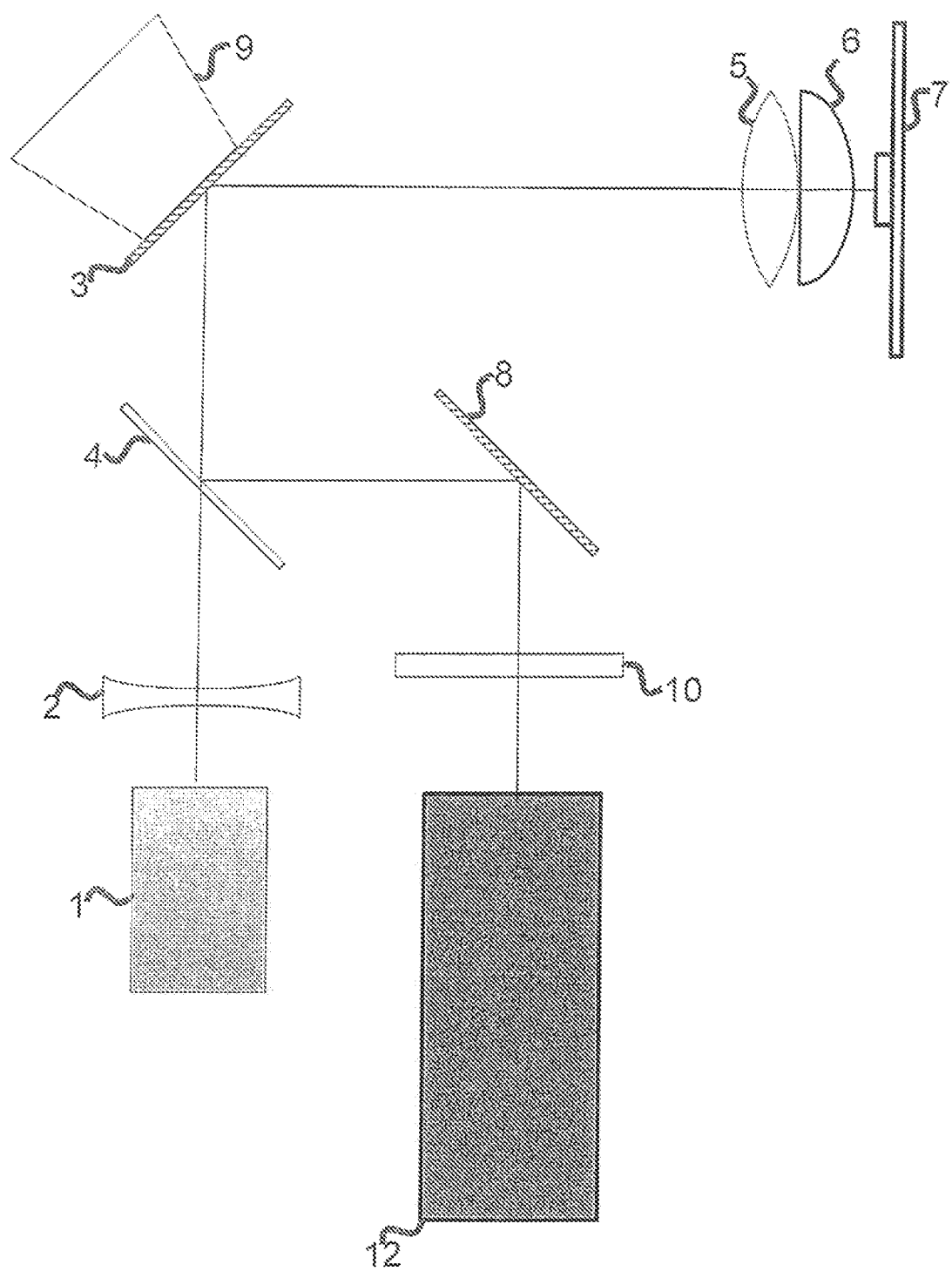

FIG. 11 presents an arrangement similar to FIG. 9 except that the mirror 11 is fixed and the mirror 3 is mounted on a piezo-electric mirror mount 9.

Figure 12:
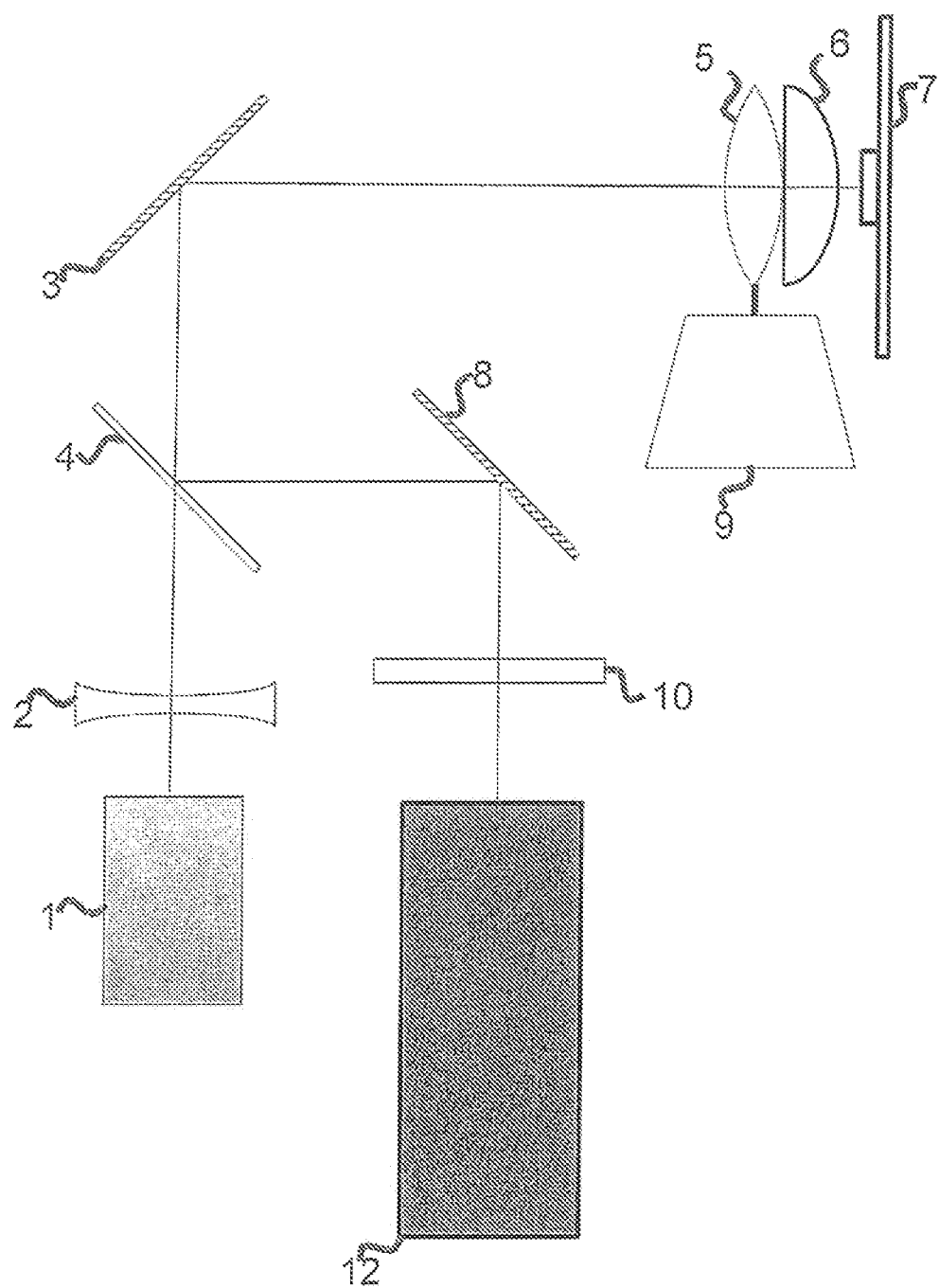

FIG. 12 is a view of another variation of the arrangement presented in FIG. 9. Mirrors 3 and 11 are fixed, the converging lens 5 is mounted on a piezo-electric mirror mount 9.

Figure 13:
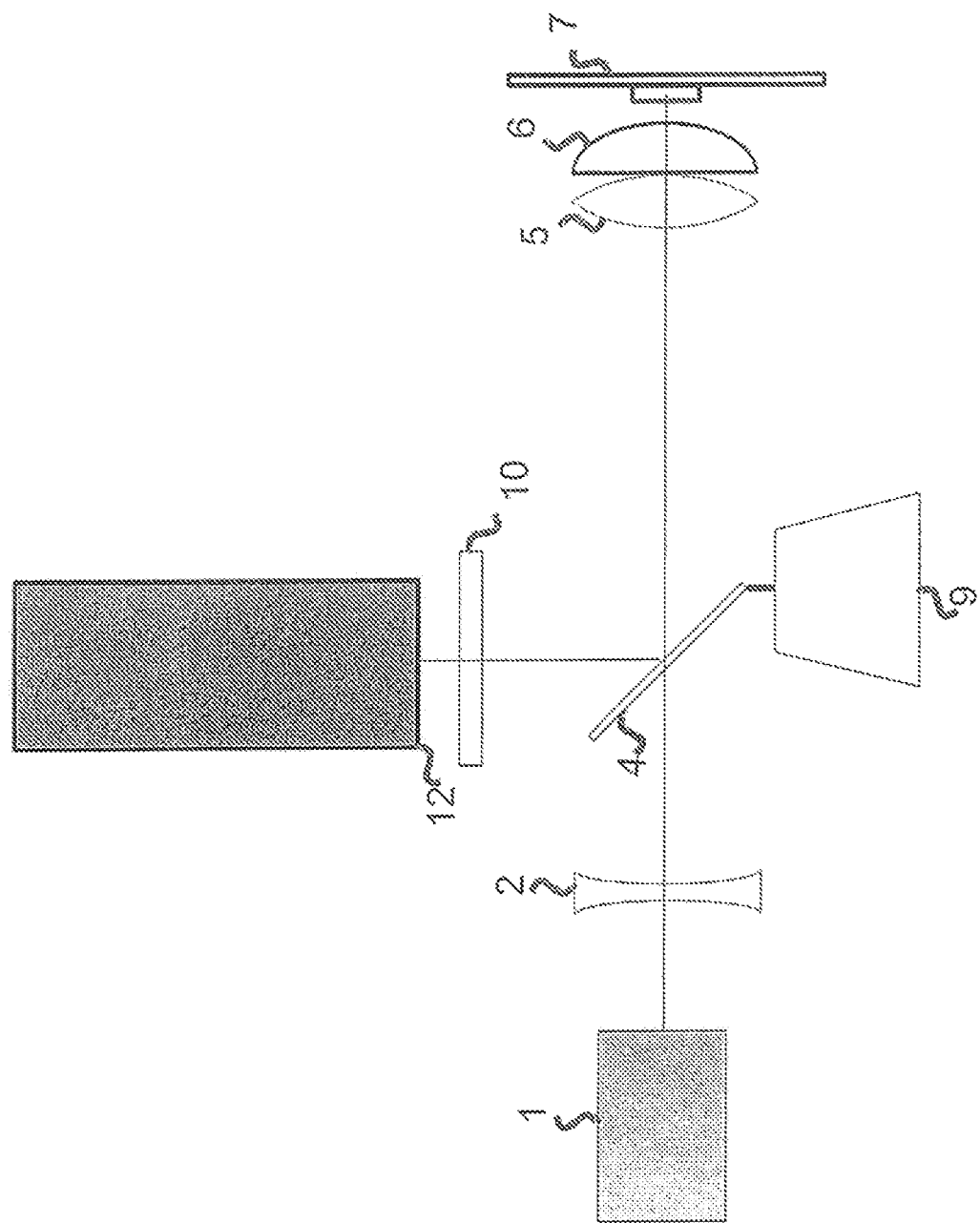

FIG. 13 shows the arrangement of a confocal microscope according to an embodiment of the present invention. In this arrangement the mirrors 3 and 11 have been omitted and the dichroic mirror 4 is mounted on the piezo-electric mirror mount 9.

Figure 14:
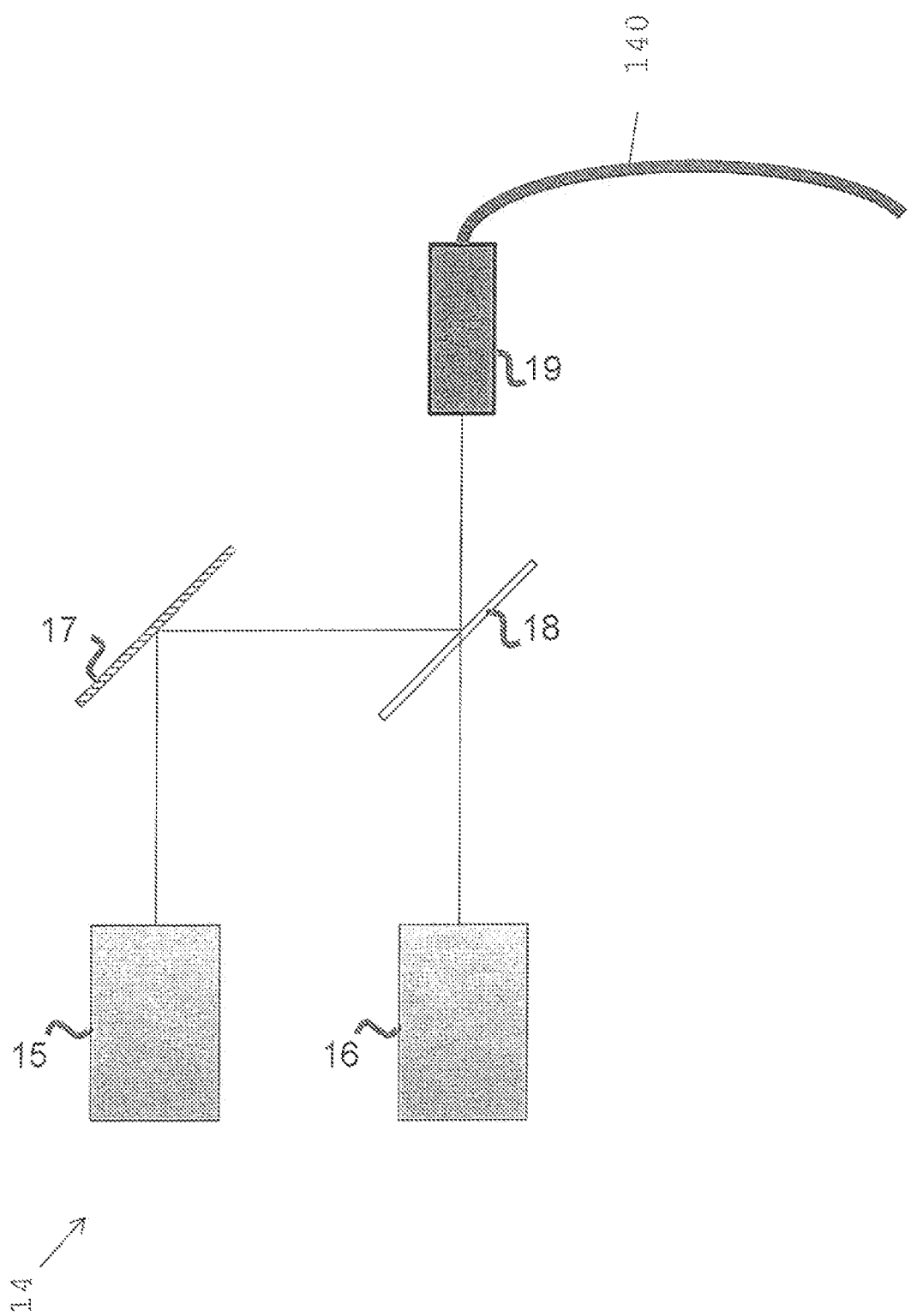
FIG. 14 shows a schematic diagram of a source module comprising two light sources for dual-colour excitation in accordance with an embodiment.

All of the above arrangements can be expanded for multi-colour detection where the light source 1 is replaced with a light source module 14 as illustrated in FIG. 14. The detector 12 is replaced by a detection module 15, illustrated in FIG. 15 and the emission filter 10 is omitted.

FIG. 14 shows a source module 14 comprising two light sources 15 and 16 for dual-colour excitation. Coupling of the light to the rest of the confocal microscope can be done by physically extending the microscope or coupling through an optical fibre 140 that can be inserted in place of the light source 1. A light source 15 emits light at a particular wavelength. The emitted light is reflected on a mirror 17 and on a dichroic mirror 18 where it is combined with the light emitted at a different wavelength by the light source 16 and transmitted by the dichroic mirror 18. The combined light from the two light sources then directly replace the light source 1 or is conducted by an optic fibre 19 to replace the light source 1 in any arrangement.

Figure 15:
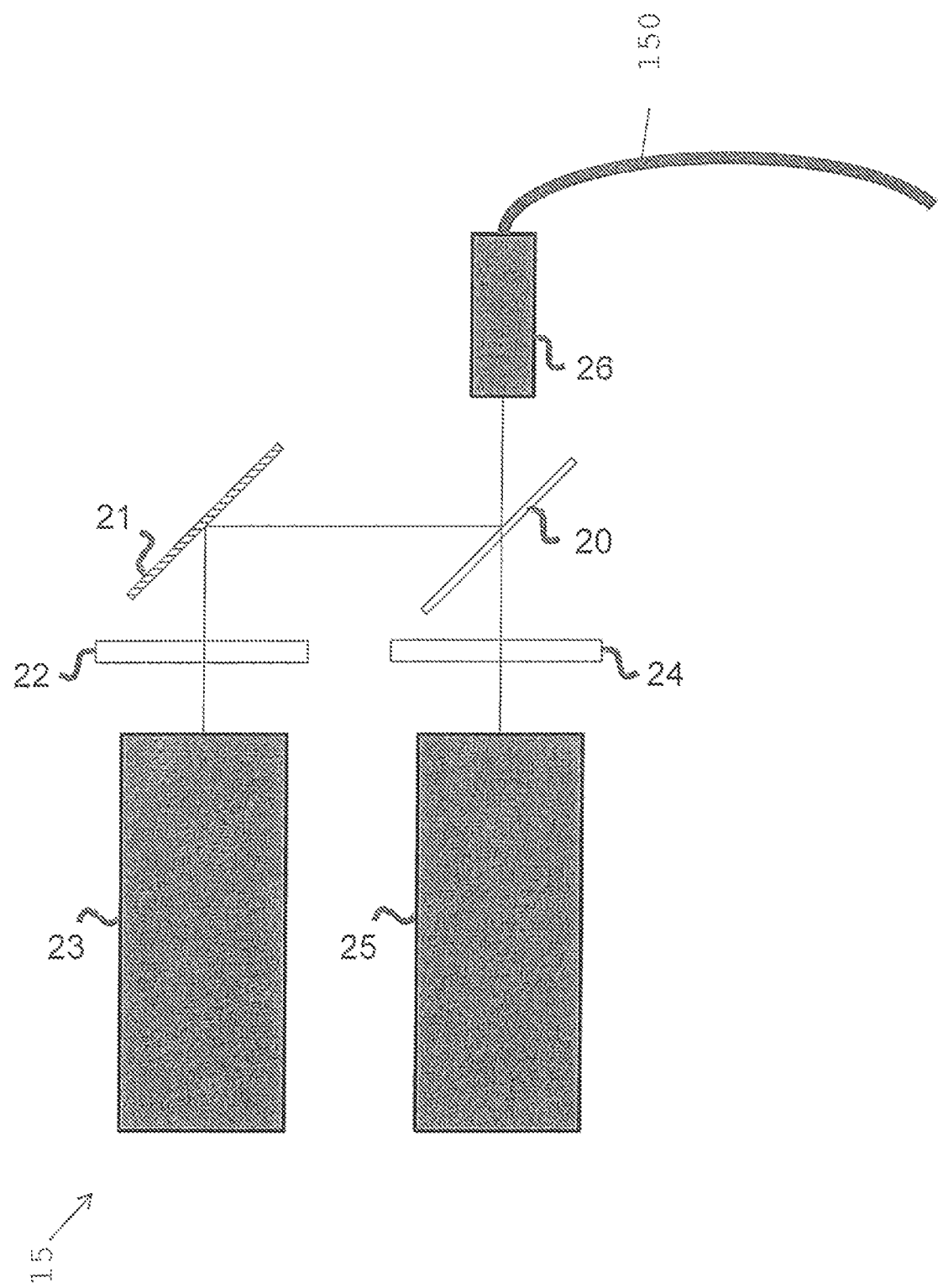
FIG. 15 shows a schematic diagram of two detectors for dual-colour detection in accordance with an embodiment.
Figure 16:
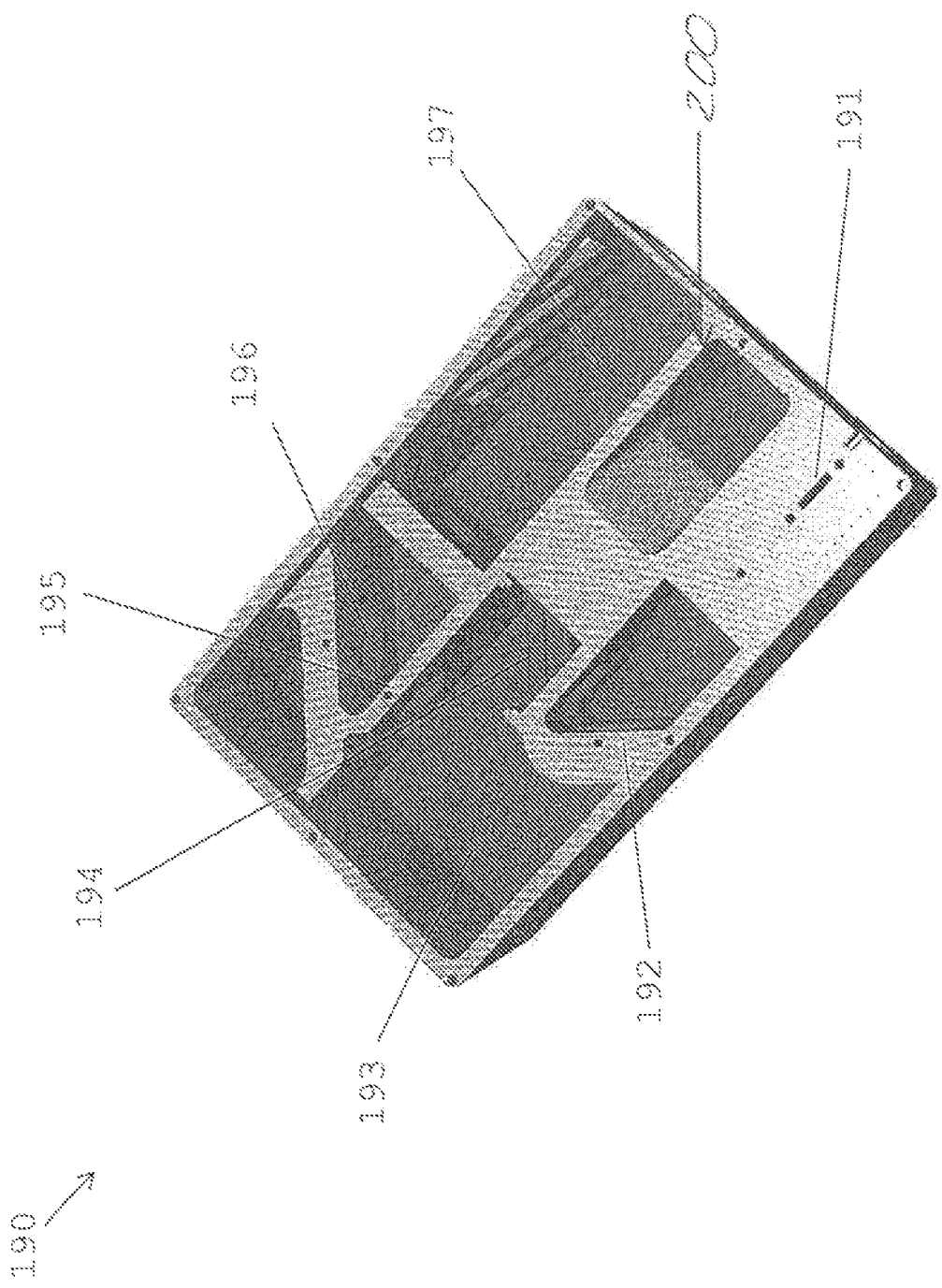
Figure 17:
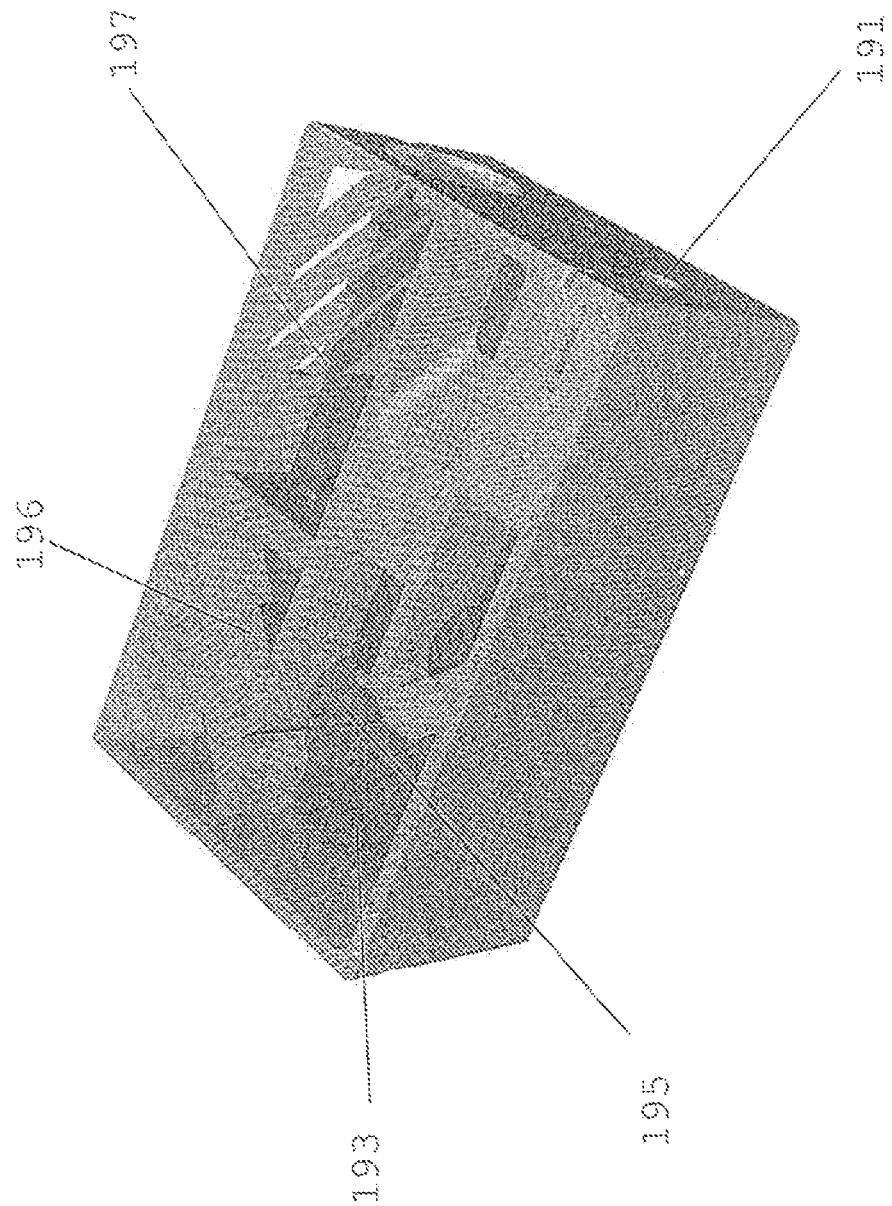
Figure 18:
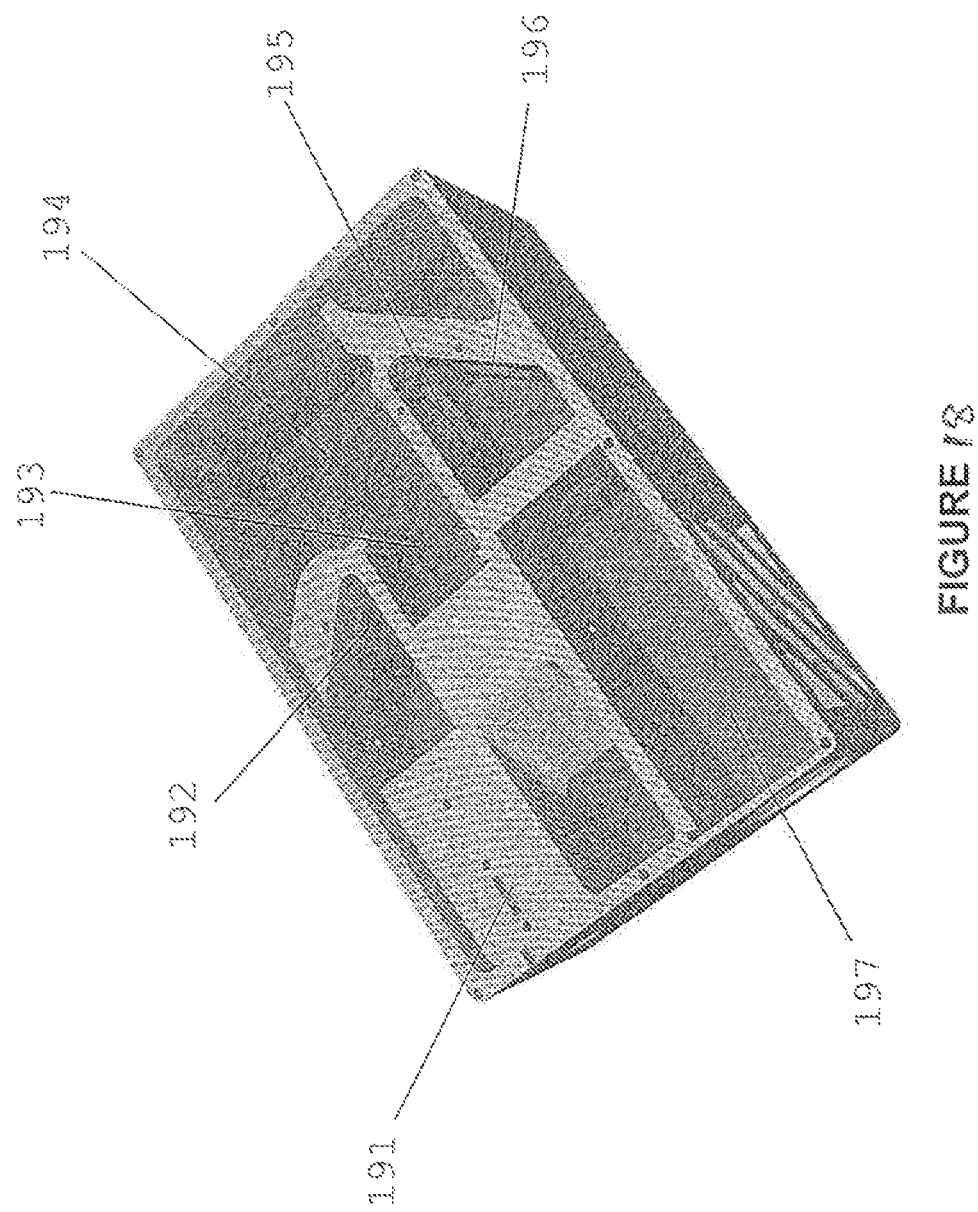
Figure 19:
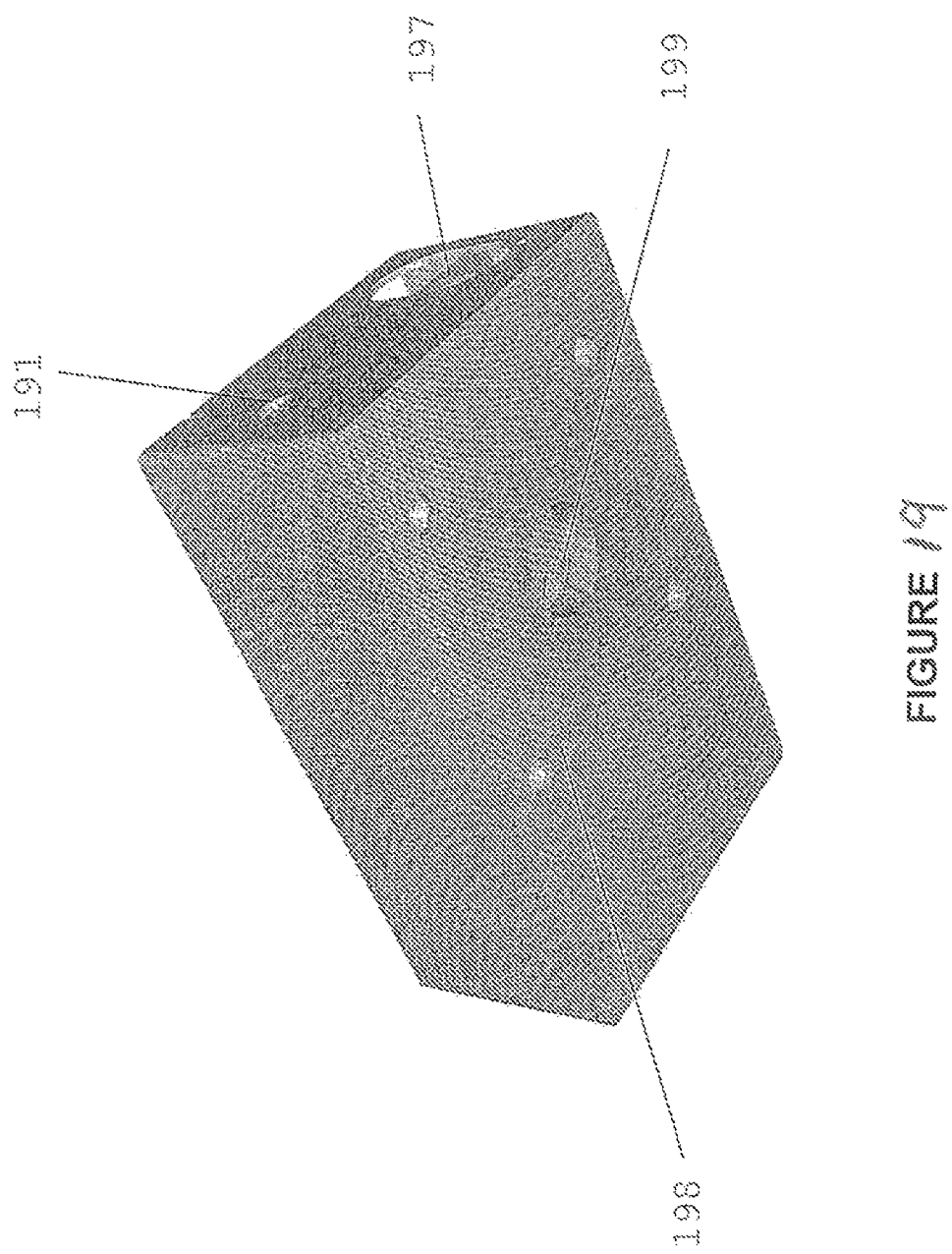
Figure 20:
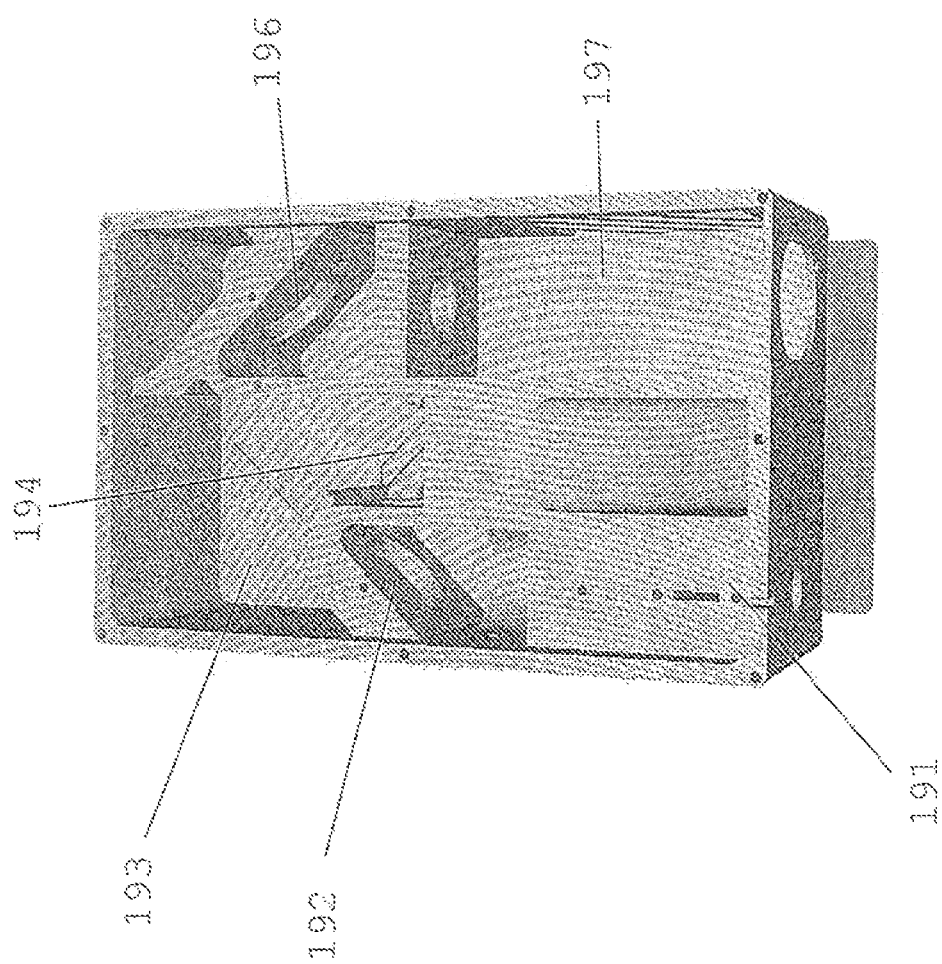
Figure 20:
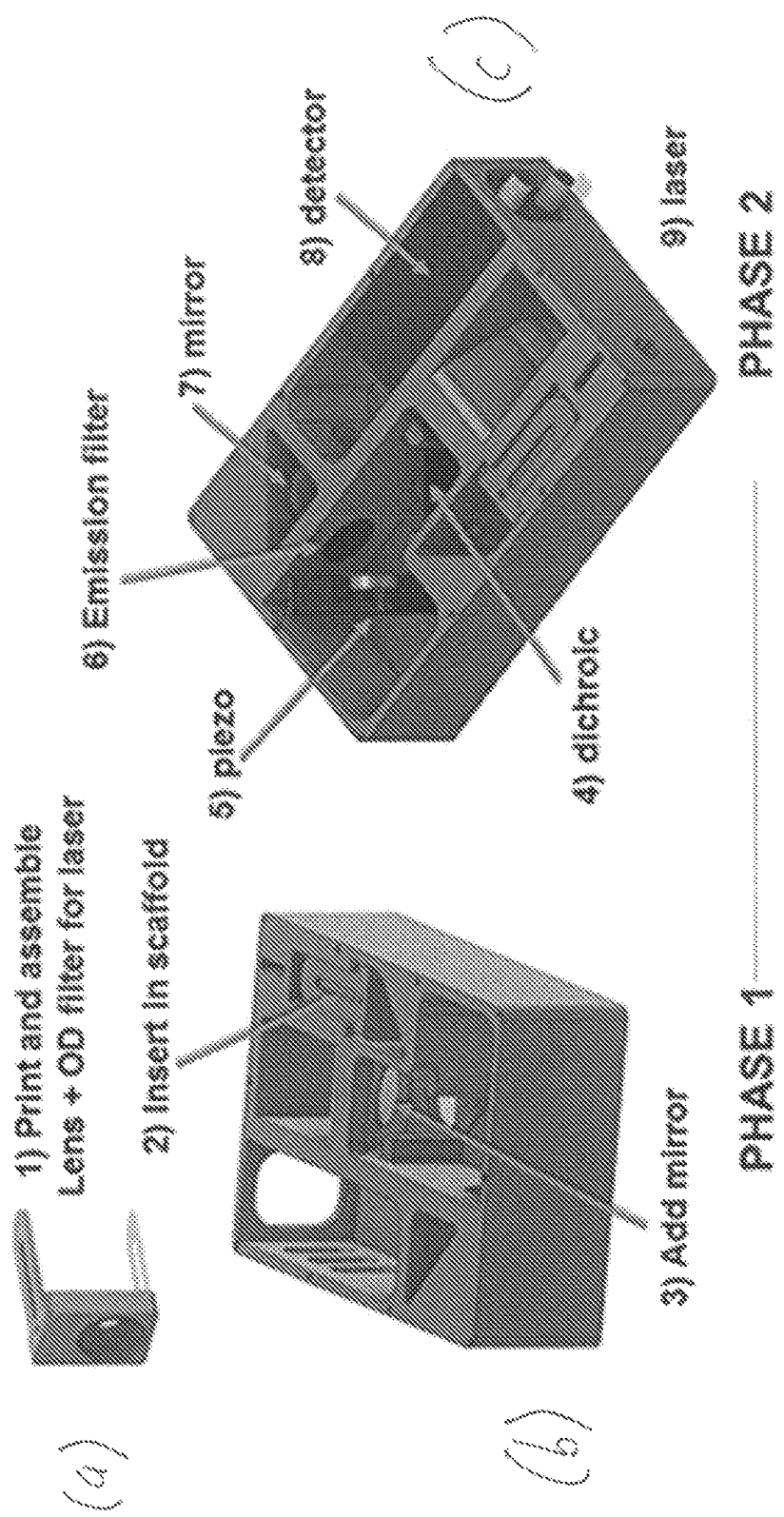
Figure 20:
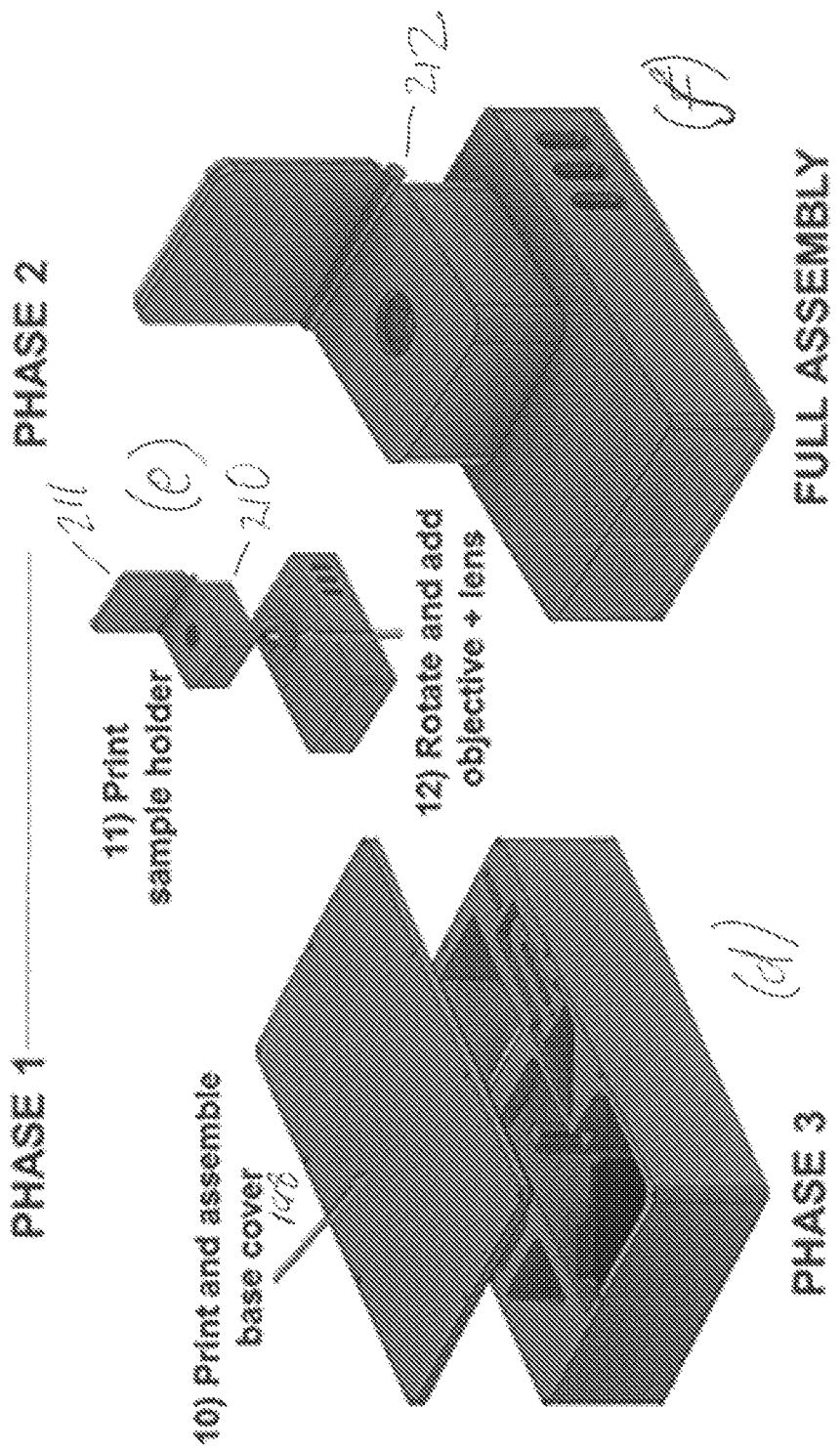

FIG. 15 shows an arrangement of two detectors (avalanche photodiode detectors) for dual-colour detection. Coupling of the detection arrangement 15 to the rest of the confocal microscope can be done by physically extending the microscope or coupling through an optical fibre 150 that be inserted in place of the detector 12. The collected fluorescence light is separated by a dichroic mirror 20. The transmitted light is reflected by a mirror 21 and enters an emission filter 22 that selects a specific wavelength region (band-pass filter) or wavelengths longer than a specified value (long-pass filter). The transmitted light then enters the detector 23. The reflected light from the dichroic mirror 20 is similarly transmitted through an emission filter 24 to enter the detector 25. The collected fluorescence light from the sample can be directly guided into the detector module 15 or be guided into the detector module 15 by an optical fibre 26.

3D Printed Microscope Housing

FIGS. 16 to 20 (f) show an example housing design of the confocal microscope in accordance with an embodiment of the invention. Housing 190 for the confocal microscope was designed to incorporate all the optical elements. A laser/light source and diverging/converging lens can be positioned within the designed space at position 191. A mount is provided at position 192 for mounting a mirror. A mirror mounted on a piezo-electric controller is accommodated at position 193. A dichroic mirror is mounted on the mount 194. A mount 195 is designed to hold a bandpass filter. Mount 196 is provided for another mirror to guide the optical beam into the detector. To ensure simplicity and stability of operation, the detector may be included as a built-in element at position 197. The excitation path (laser+ diverging/converging lens) was placed on the other side of the microscope to keep the microscope objective in the middle of the body. To save additional space, the microscope objective is orthogonal to the plane of excitation and detection. This was achieved by introducing a mirror at an angle of 45 degrees, and fixing the objective directly on top of this mirror.

Housing 190, in this embodiment, is a monolithic block and is designed to accommodate all the optical elements of the confocal microscope, within the body 200 indie the housing walls, light source, detectors, microscope objective and other optical components. The monolithic housing 190 is designed in such a manner that after mounting all the optical components at their respective positions in the housing, the components are positioned in optical alignment.

Furthermore, the optical components are mounted inside the housing by screws. The screw holes for holding the optical components are engineered at an optimal angle to ensure their easy accessibility. Mirrors, filters, lenses are all secured by metallic screws with TEFLON® brand polytetrafluoroethylene tips. The dichroic mirror is slid in place with gentle pressure and does not require additional fixation. For fine tuning of the focal volume, the diverging lens is fixed on a sliding element. This enables to modify the position of the focal plane of the lens on a single axis of translation, keeping the lens aligned.

Housing 190 includes side walls 191-194 and a top surface 195, and the microscope is closed by a bottom cover 198 that is secured by metallic screws. The design of housing 190 and bottom cover is such that external light is completely prevented from entering the microscope, reducing the background noise at the detector. The tightness of the fit of the two printed parts ensures the correct alignment and stability of the whole system, as the cover presses gently against all optical elements to keep them in place.

A sample holder 210 (FIG. 20(e)) is provided at the bottom of the housing to install a sample. The sample holder is detachable and is made of two separate parts, but can be printed together and assembled easily. A mount 199 is designed to accommodate the microscope objective. The sample holder comprises a turret, whose height is adjusted to the size/model of the microscope objective used, and a sample cover 211. The sample cover can be closed during the measurement by flipping along the printed hinges 212.

FIGS. 20(a) to 20(f) illustrate the housing and the various steps in formation and assembly of the housing. Process is as follows:

The main scaffold is printed (see 20(b)). Then the process is as follows:
1. Print the holder for the diverging lens and the OD filter. Assemble by inserting gently the OD filter in the inside of the holder, and the diverging lens on the outer face of the holder.
2. Insert in the housing body and tighten loosely in place.
3. Add mirror in the 45° holder and tighten in place through the side hole.
4. Insert the dichroic by gentle vertical pressure; the plastic will hold the dichroic in place.
5. Insert the piezo and tighten firmly in place.
6. Insert the emission filter and tighten in place
7. Insert the mirror and tighten in place
8. Insert the detector; the detector will be held in place by tightening the base cover
9. Insert the laser and tighten in place.
10. Print the base cover and screw onto housing.
11. Print the sample holder.
12. Flip the assembly and insert the lens and microscope objective.

Insert the sample holder on top of the housing, and adjust height of the objective.

The housing of the above-described embodiment is 3D printed, but the invention is not limited to this. In other embodiments, the housing may be manufactured in other ways. For example, a monolithic housing may be injection moulded from plastics or other materials. The housing may be assembled from a plurality of components. It may be manufactured in any other way.

The housing body 200 of the above embodiment is designed with various mounts for receiving the optical components to implement one of the configurations described previously. It will be appreciated that the body can be designed to implement any of the configurations described with reference to FIGS. 1 to 15 above, or any other configuration.

In the above embodiment, the dimensions of the microscope are 12 centimetres by 18 centimetres by 10 centimetres. It will be appreciated that the dimensions may vary from this, depending on optical configuration or other requirements. In the above embodiment the photo detector is in the order of 8 centimetres of length. Reducing the size of the photo detector may result in the reduction in the size of the housing.

In this embodiment the photo detector is a bolzano detector by Micro Photon Devices™ (MPD™). It may be any other photo detector or detector. With this arrangement, the focusing lense near the objective is 20 centimetres focal length (usually a cemented triplet for achromatic correction). The diverging lens for the laser has a 6 centimetre focal length, positioned at 14 cm away from the collecting lens.

The piezo mount for the mirror, in an embodiment, is a Newport™ Agilis piezo mirror mount, model AG-M100N. Other types of mounts may be utilised.

EXAMPLES

The following description discusses examples of application of a confocal microscope in accordance with an embodiment of the present invention.

Single Molecule Detection and FCS

Figure 21:
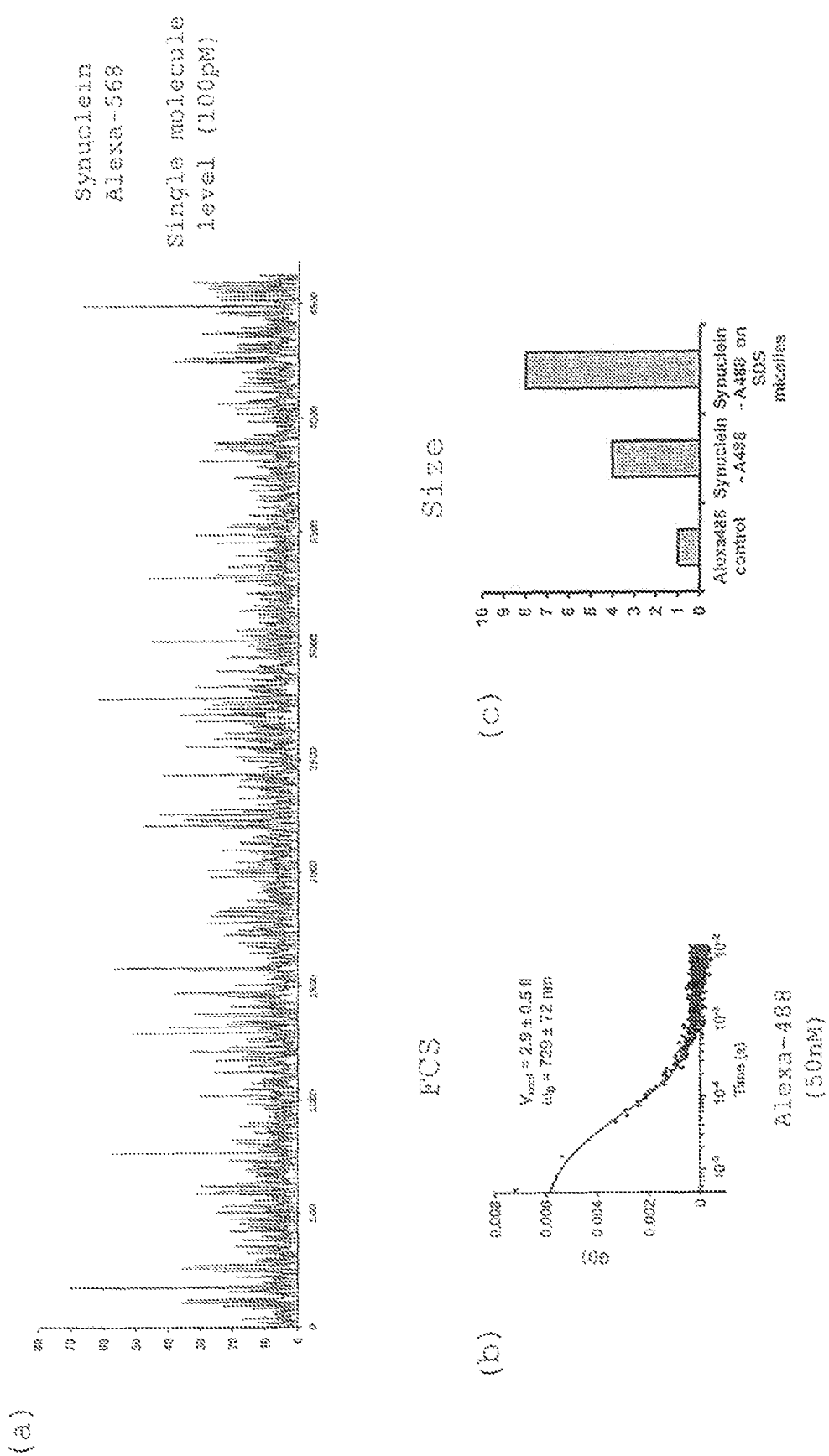
FIG. 21(a) shows a typical single-molecule fluorescence time trace for the synuclein protein labelled with a fluorescent dye (Alexa568)
FIG. 21(b) corresponds to FCS detection data obtained for Alexa488 dye alone.
FIG. 21(c) shows the changes of diffusion coefficient (size) relative to the Alexa488 control, for synuclein-A488 and synuclein-A488 binding to SDS micelles (in solution of 5 mM SDS)

FIG. 21(a) shows a typical single-molecule fluorescence time trace for the synuclein protein labelled with a fluorescent dye (Alexa 488). FIG. 21(b) corresponds to FCS detection data obtained for Alexa 488 dye alone. FIG. 21(c) shows the changes of diffusion coefficient (size) relative to the Alexa488 control, for synuclein-A488 and synuclein-A488 binding to SDS micelles (in solution of 5 mM SDS).

Photon Counting and Number & Brightness Analysis

Figure 22:
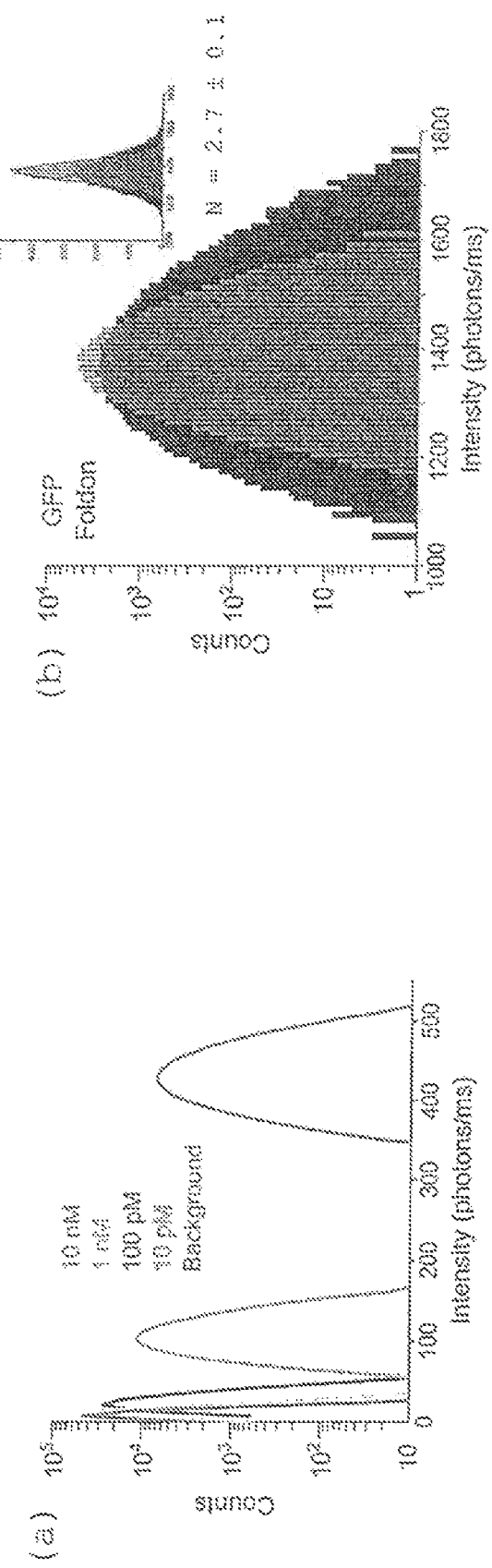
FIG. 22 shows an application of the present invention for quantification of the size of "oligomer"

FIG. 22 shows an application of the present invention for quantification of the size of "oligomer". FIG. 22(a) shows the Photon Counting Histograms obtained for different species and concentrations. It is a representative trace for a monomeric GFP protein. From this data, a brightness parameter (B) can be calculated using formula: $=[SD]^2/\mu$, where SD is the standard deviation and $\mu$ is the mean of the corresponding data. The calculated B parameter for monomeric GFP is 10. FIG. 17(b) shows the Number and Brightness analysis performed on a GFP monomer and GFP trimer (induced by the trimeric foldon motif). Note that the thickness of the trace in this figure is larger than in FIG. 16A, which translates into a B parameter of 30, three times larger than the B value for monomeric GFP.

Bacterial Detection

Figure 23:
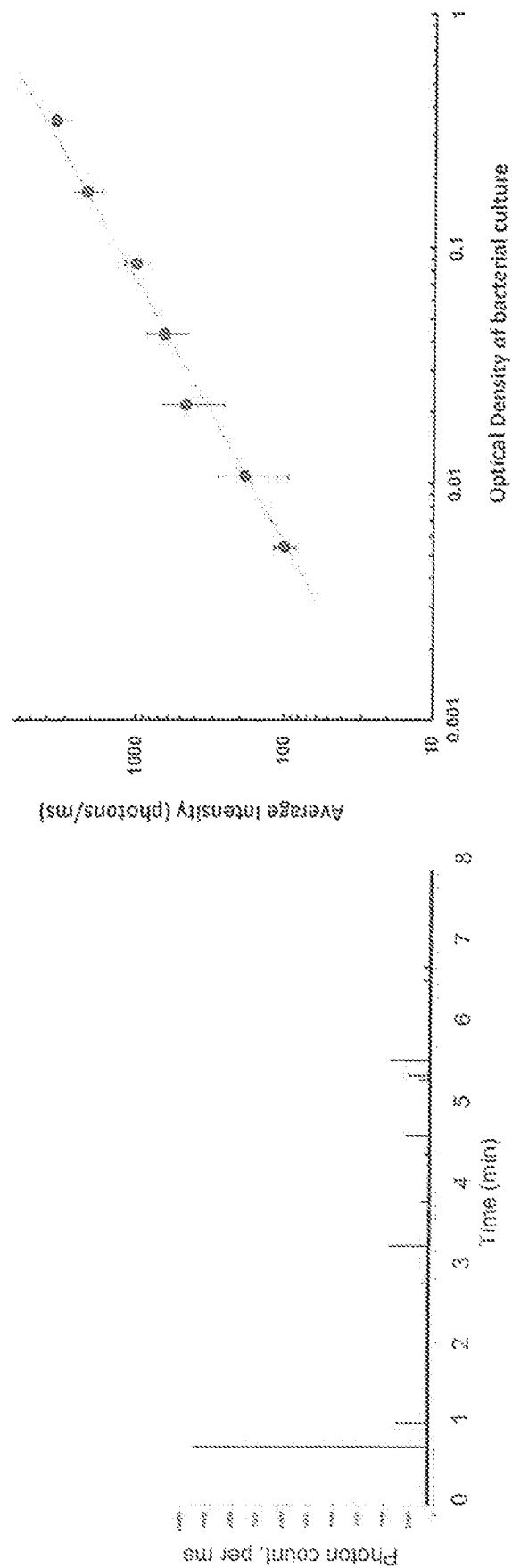
FIG. 23 shows the application of the present invention to the detection of bacteria.

FIG. 23(a) shows a fluorescent time trace where large fluorescent events correspond to mCherry-expressing bacteria (E.coli). The experiment was performed as follow: E.coli BL-21(AI) cells, transformed with mCherry—mCherry expressing vector (pCellFree_G05), were grown in LB+Ampicillin (100 µg/mL final concentration) and the protein production was induced by adding 0.2% Arabinose to the culture. The mCherry—mCherry tandem expressing cells were diluted to the O.D. of 0.08 and 200 µL of this solution was plated on LB agar plates containing 100 µg/mL of Ampicillin. The cells were allowed to air dry for 2 min and a part of the plate was swabbed using a wet swab (cotton applicator wooden stick with single tip dipped in MilliQ water). The bacteria were retrieved by slow centrifugation (2000 rpm for 1 min) and 10 µL sample was read for 120 s on the microscope of an embodiment, equipped with a 532 nm laser source.

FIG. 23(b) shows the linear relationship between the brightness of a 120 sec fluorescent time trace as a function of the O.D of the bacterial solution. The experiment is as follow: a serial dilution of a starting bacterial culture of BL21 E.coli, expressing GFP, at O.D=0.6 was realized in PBS. 20 uL of each dilution was analysed on the NanoBright and a 120 sec time trace was recorded on the NanoBright equipped with a 450 nm laser source. Brightness was calculated for each trace and plotted as a function of O.D.

Detection of Liposomes, Lysis of Liposomes

Figure 24:
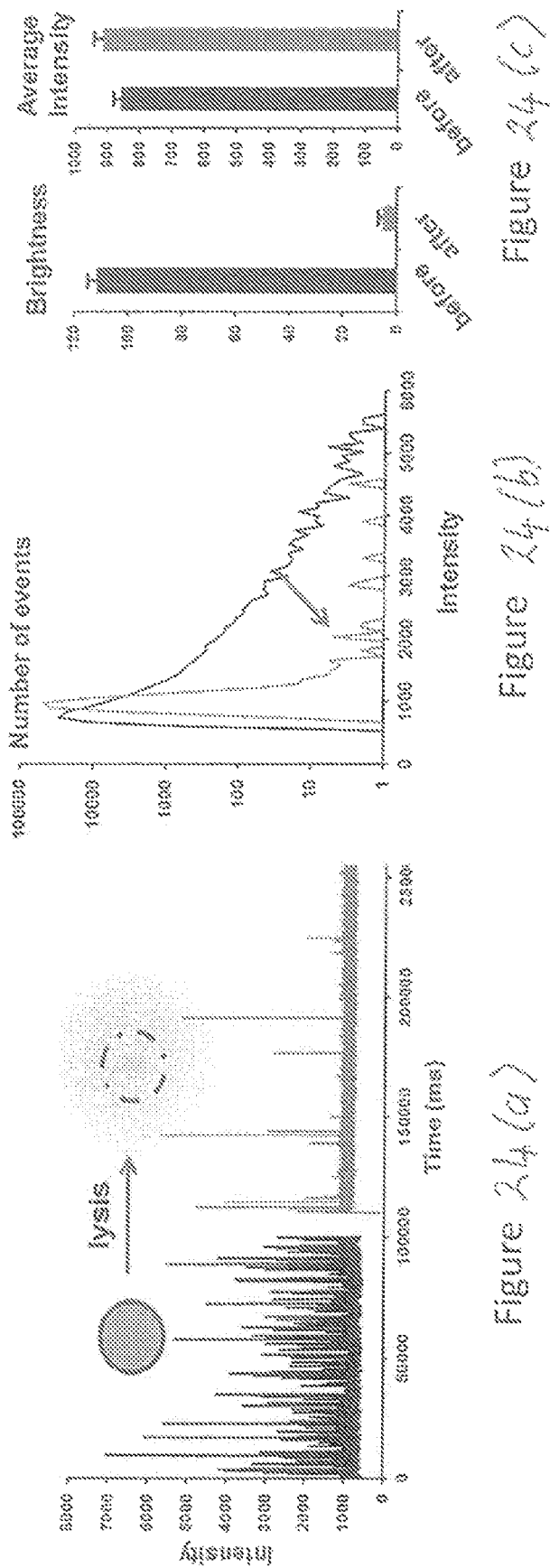
FIG. 24(a) shows a typical fluorescent time trace recorded for a solution of liposomes encapsulating a fluorescent dye, before and after Triton X treatment.
FIG. 24(b) shows the brightness plot analysis corresponding to the two parts of the trace (before and after Triton X treatment)
FIG. 24(c) illustrates that Triton X treatment causes a dramatic change in the brightness parameter.

FIG. 24(a) shows a typical fluorescent time trace recorded for a solution of liposomes (50:50 PC:PS) encapsulating a fluorescent dye (Alexa488), treated with 1% Triton X after 100 sec. Triton X causes the rupture of the lipidic membrane and release of the fluorescent dye into the medium. FIG. 24(b) is the brightness plot analysis corresponding to the two parts of the trace (before and after Triton X treatment) while FIG. 24(c) shows that Triton X treatment causes a dramatic change on the Brightness parameter but not on the average fluorescence intensity. The experiment is as follow: liposomes made of a 50:50 mixture of PC and PS (Avanti polar lipids) were extruded following standard protocols to a final size of 100 nm radius. They were filled with Alexa488, and the excess dye outside the liposomes was removed by gel filtration. 20 uL of the solution was analyzed on the microscope of an embodiment, equipped with a 450 nm laser source. In the first part of the experiment, liposomes are observed intact in buffer, and the detector records large bursts of intensity. After 100 s, the laser was turned off; a 1% triton solution was mixed with the liposomes to mimic their leakage of fluorescence into solution. The laser was turned on again immediately after mixing, and the trace shows a slightly higher background, where few peaks remain.

Detection of Antibodies Aggregation

Figure 25:
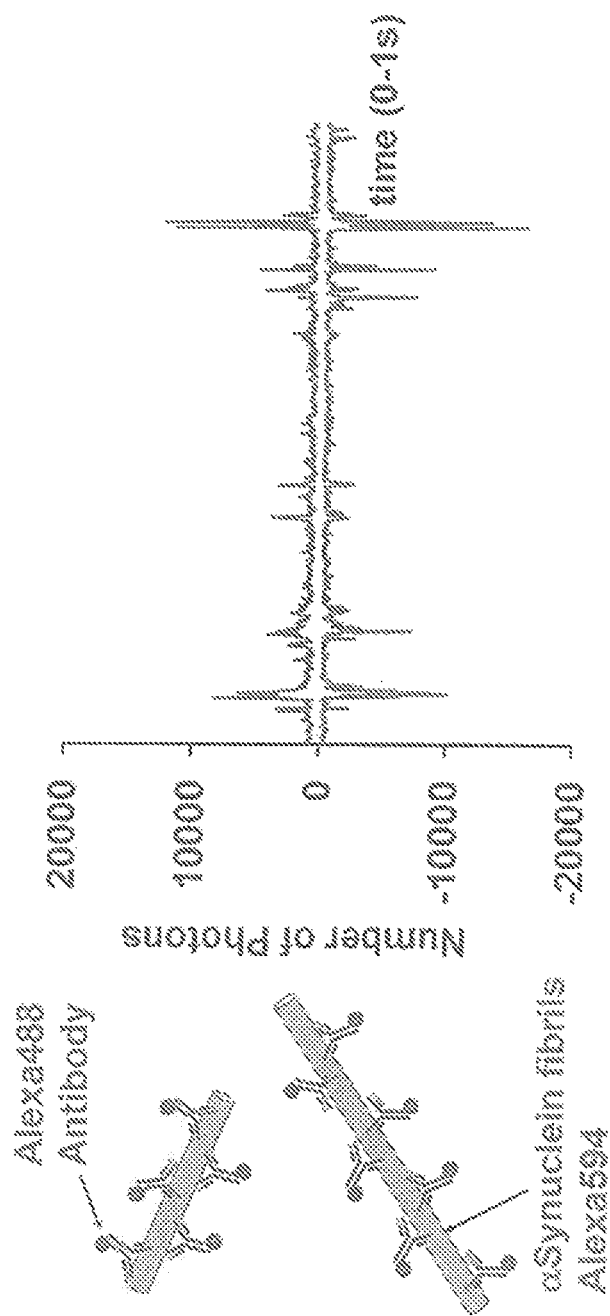
FIG. 25(a) shows a typical fluorescent time trace of a primary antibody binding to protein aggregates, as detected by a secondary antibody fluorescently labelled for a classical confocal microscope.
FIG. 25(b) shows results of use of a microscope in accordance with an embodiment of the present invention.
Figure 25B:
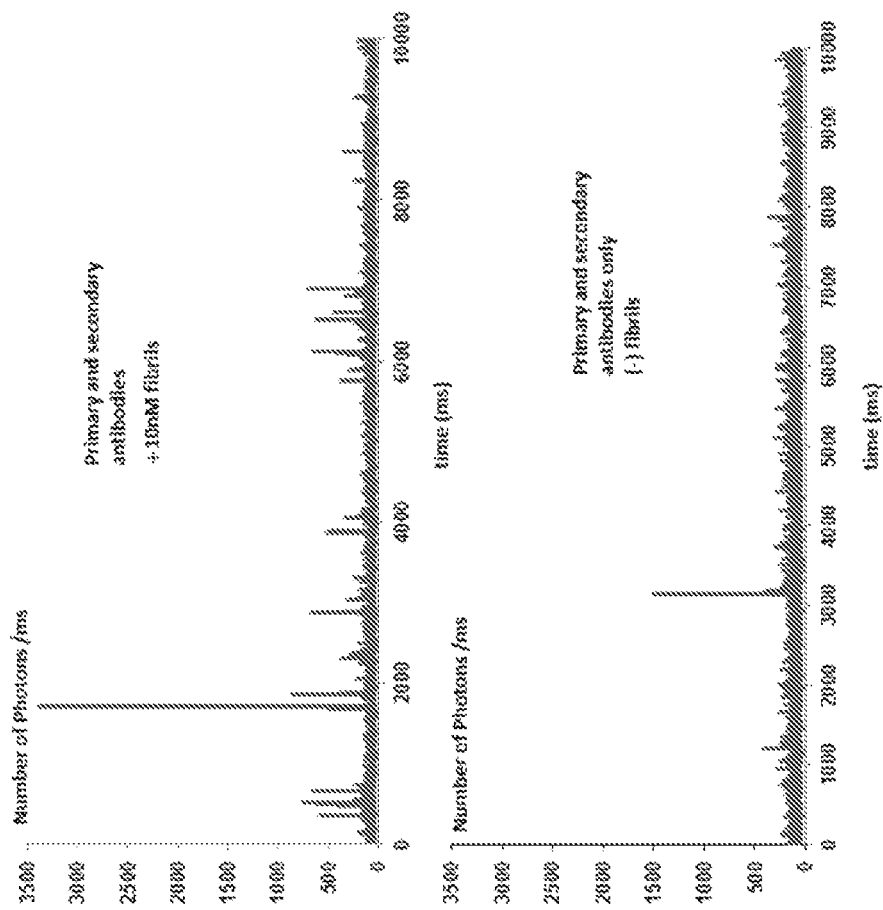

FIG. 25 shows a typical fluorescent time trace of a fluorescently labelled primary antibody detecting protein aggregates. The experiment is as follows:

antibodies specific to fibrillar forms of synuclein were incubated for 15 minutes with a-synuclein fibrils labelled at 10% with Alexa-594 and detected using an anti-mouse Alexa488-labelled secondary antibody. In the control two colors detection experiment conducted on a classical confocal setup, perfect co-diffusion of antibodies and target fibrils was observed. The same sample was measured on the microscope in accordance with an embodiment of the present invention, equipped with a 450 nm laser source and can be used to quantify the presence of fibrils (FIG. 25(b)).

Detection of Protein Aggregates

Figure 26A:
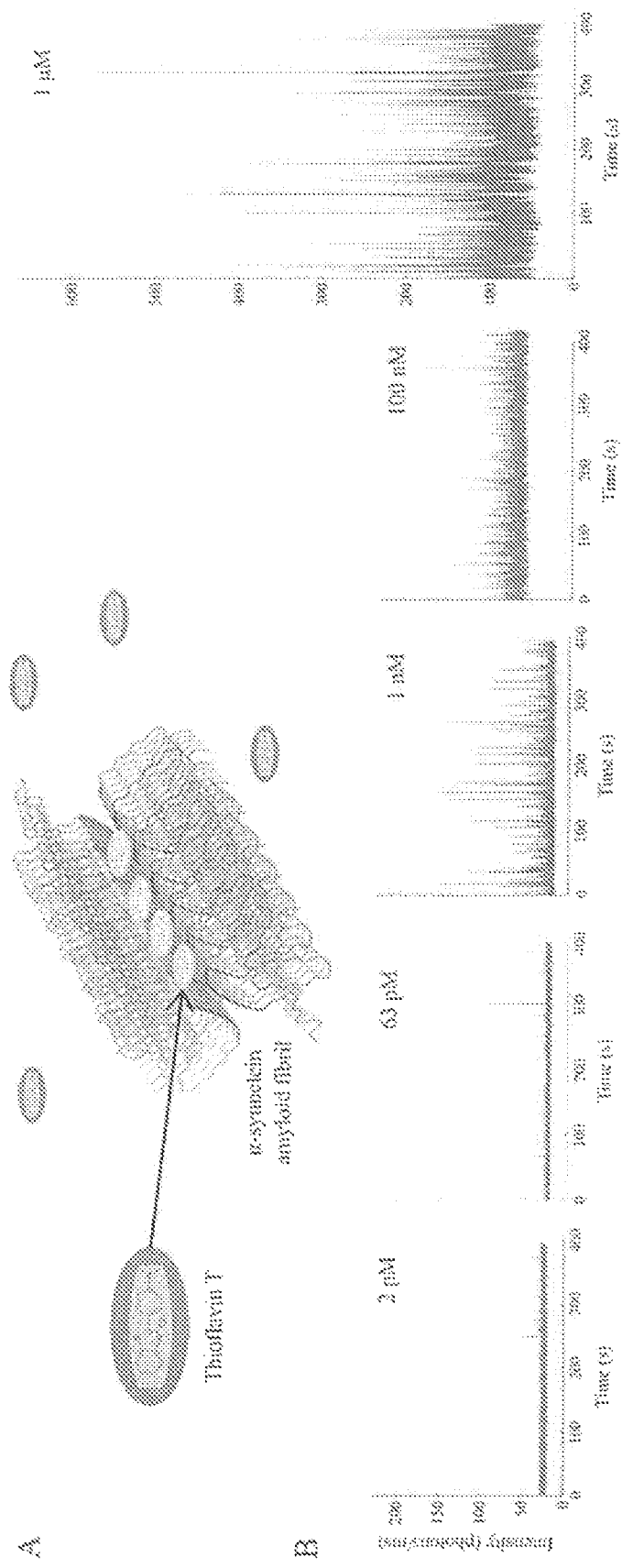
FIG. 26(a) shows typical time traces obtained for detection of protein aggregates by ThT.

FIG. 26(a) shows typical time traces obtained on microscope according to an embodiment for detection of protein aggregates by ThT.

(A) ThT binds specifically to amyloid fibrils and increases fluorescence upon binding. (B) Example traces of ThT (1 μM) binding to amyloid fibrils and measurement of different concentrations of mature α-synuclein amyloid fibrils (405 nm excitation, acquired at 100 Hz for 400 s).

Figure 26B:
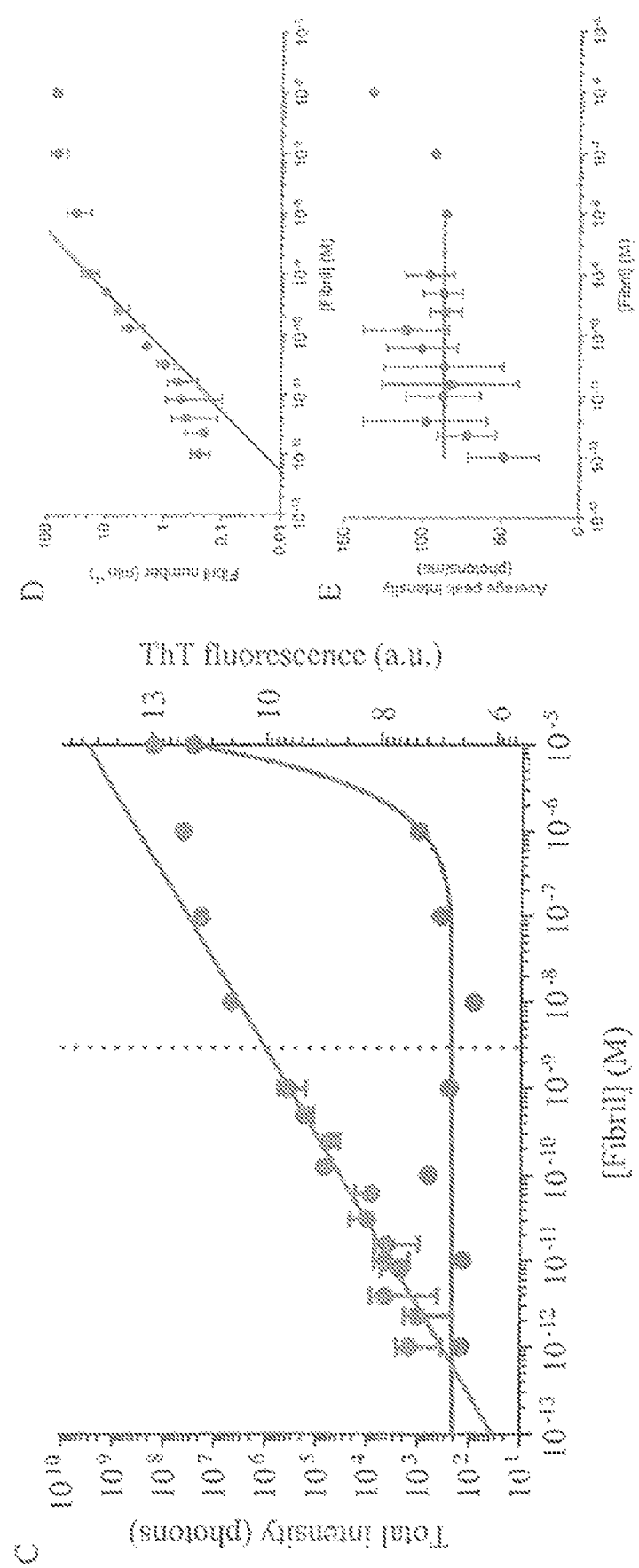
FIG. 26(b) shows a comparison between a commercial plate reader and an embodiment of the present invention.

FIG. 26(b) shows the comparison between a commercial plate reader and the microscope according to an embodiment. The sensitivity limits are found to be 1 uM and 1 pM for the fluorimeter and the embodiment microscope, respectively.

(C) Total ThT intensity detected by NanoBright (light blue) or a bulk measurement using a fluorescence platereader (BMG labtech, red). Before dotted line (lower concentrations), microscope data analysed by integrating individual peaks. After dotted line (higher concentrations), microscope data analysed by subtracting total background intensity from total sample intensity. Dotted line marks concentration at which individual fluorescent bursts cannot be reliably separated. The dotted line is 3 orders of magnitude lower than the typical sensitivity of a bulk measurement. (D-E) Deconvolution of number and size of aggregates measured in panel C. (D) Number of ThT-positive species detected by the embodiment microscope across serial fibril dilutions. Linear range ~10-11-10-9 M. (E) Average peak intensity remains constant with fibril length across a wide range of concentrations (~10-11-10-8 M).

For FIG. 26: The experiments are as follows: Wild-type and A90C α-synuclein was expressed and purified as described previously in the literature, divided into aliquots, flash frozen in liquid N2 and stored in 20 mM phosphate buffer (PB, pH 7.4, 0.01% NaN3) at −80° C. A90C α-synuclein was labelled with maleimide-modified Alexa Fluor 488 or Alexa Fluor 568 dyes (ThermoFisher Scientific, Waltham, MA, USA) via the cysteine thiol moiety. The labelled protein was purified from the excess of free dye by dialysis against PB at 4° C. overnight, divided into aliquots, flash frozen in liquid N2 and stored at −80° C.

Preformed fibrils, used to determine the detection limit for amyloid aggregates, were formed by incubating 200 μM monomeric α-synuclein (PBS, pH 7.4) at 45° C. with stirring by a Teflon bar. At 24 h intervals, the fibril solution was sonicated using a water bath sonicator for 15 mins. After 72 h, the fibril solutions were divided into 50 μM aliquots, flash frozen with liquid N2 and stored at −20° C. until required. For the detection of fibrils experiments, the solutions were diluted to 5 μM in PBS and sonicated for a further 10 min just before use.

A serial dilution of this starting solution of PBS was realized and 20 uL of each dilution were placed on the embodiment microscope for analysis. ThT was mixed into the solution to a final concentration of 1 uM and allowed to react for 5 min before reading. Multiple 300 sec fluorescent time traces were recorded using a embodiment microscope equipped with a 405 nM laser and a 40× water immersion objective (Zeiss). Events were defined as time points were the fluorescent intensity is above the average intensity plus 3 standard deviation of a corresponding time trace obtained for 20 uM monomeric α-synuclein and 1 uM ThT.

The above embodiments provide an improved confocal microscope which is easy to calibrate, free from optical misalignments, compact in size, stable, and inexpensive in comparison to conventional microscopes.

The term "comprising" (and its grammatical variations) as used herein are used in the inclusive sense of "having" or "including" and not in the sense of "consisting only of".

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A confocal microscope, comprising a housing for mounting a detector and a plurality of optical components, at least some of the optical components being fixed in position within a body of the housing;
   wherein the housing comprises a base and one or more mounts for mounting at least two of the plurality of optical components, wherein the mounts are arranged so that the optical components to be mounted to the mounts are calibrated in use.

2. A confocal microscope in accordance with claim 1, wherein the housing and the body are integrated and are manufactured by a process of 3D printing.

3. A confocal microscope in accordance with claim 1, including a feedback loop, wherein the feedback loop is arranged to calibrate the detector and at least one of the plurality of optical components.

4. A confocal microscope in accordance with claim 3, wherein the confocal microscope includes at least one of: a light source for illuminating a sample, an objective for receiving radiation from the sample, a band pass filter, a lens, a mirror, a scanning mirror and a dichroic mirror.

5. A confocal microscope in accordance with claim 4 comprising a diverging lens to diverge a light beam emitted by the light source.

6. A confocal microscope in accordance with claim 5 wherein the diverging lens is placed in an optical beam path between the light source and the sample.

7. A confocal microscope in accordance with claim 5 wherein the diverging lens having a suitable divergence ensures a minimum optical path length between the light source and the sample.

8. A confocal microscope in accordance with claim 5 wherein the diverging lens is a bi-concave or plano-concave lens.

9. A confocal microscope in accordance with claim 4 further comprising a converging lens to converge a light beam emitted by the light source.

10. A confocal microscope in accordance with claim 1 wherein the detector comprises at least a photo-detector and a scanning mirror.

11. A confocal microscope in accordance with claim 10 wherein the scanning mirror is arranged to deliver fluorescent light collected from the sample to the photo-detector.

12. A confocal microscope in accordance with claim 9 wherein during calibration, the feedback arrangement selects a spatial orientation of the scanning mirror that corresponds to an optimised photo-detector output.

13. A confocal microscope in accordance with claim 9 wherein a piezoelectric material is used for providing spatial movement of the scanning mirror for facilitating calibration of the detector and the at least one of the plurality of optical elements by the feedback loop.

14. A confocal microscope in accordance with claim 4 wherein the light source is a laser source emitting laser beam of suitable cross-sectional area and suitable wavelength range.

15. A confocal microscope in accordance with claim 4 wherein the 3D printed housing is made of PLA (polylactide), ABS (Acrylonitrile butadiene styrene), PC (Polycarbonate) or HDPE (High-density polyethylene) material.

16. A confocal microscope in accordance with claim 1, wherein the housing has dimensions of 18 cm×12 cm×10 cm.

17. A method of manufacturing a confocal microscope using 3D printing, the method comprising the steps of 3D printing a housing comprising a body including a plurality of aligned mounts, mounting a detector and a plurality of optical components within the body of the 3D printed housing, wherein at least two of the plurality of optical components are mounted in mounts of the plurality of aligned mounts so that the at least two of the plurality of optical components are calibrated in use.

* * * * *